US010557065B2

(12) United States Patent
Niiyama et al.

(10) Patent No.: US 10,557,065 B2
(45) Date of Patent: Feb. 11, 2020

(54) ADHESIVE LAYER-EQUIPPED TRANSPARENT SURFACE MATERIAL, DISPLAY DEVICE AND PROCESSES FOR THEIR PRODUCTION

(71) Applicant: AGC Inc., Chiyoda-ku (JP)

(72) Inventors: Satoshi Niiyama, Chiyoda-ku (JP); Toyokazu Suzuki, Chiyoda-ku (JP); Naoko Aoki, Chiyoda-ku (JP); Hitoshi Tsushima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 224 days.

(21) Appl. No.: 15/449,190

(22) Filed: Mar. 3, 2017

(65) Prior Publication Data

US 2017/0174961 A1 Jun. 22, 2017

Related U.S. Application Data

(63) Continuation of application No. 13/914,273, filed on Jun. 10, 2013, now abandoned, which is a
(Continued)

(30) Foreign Application Priority Data

Dec. 8, 2010 (JP) .................................. 2010-273720

(51) Int. Cl.
*C09J 175/08* (2006.01)
*C09J 4/00* (2006.01)
(Continued)

(52) U.S. Cl.
CPC .............. *C09J 175/08* (2013.01); *B32B 3/10* (2013.01); *B32B 7/12* (2013.01); *B32B 37/10* (2013.01);
(Continued)

(58) Field of Classification Search
CPC ........ C09J 175/08; C09J 4/00; C09J 2475/00; C09J 2201/40; C09J 2201/622;
(Continued)

(56) References Cited

U.S. PATENT DOCUMENTS 4,599,274 A 7/1986 Ando et al.
4,724,023 A 2/1988 Marriott
(Continued)

FOREIGN PATENT DOCUMENTS

CN 101588922 A 11/2009
JP 1-170473 12/1989
(Continued)

OTHER PUBLICATIONS

Lagakos et al., Frequency and temperature dependence of elastic moduli of polymers, Journal of Applied Physics, 59, 1986, 4017-4031.*
(Continued)

*Primary Examiner* — Eli D. Strah
(74) *Attorney, Agent, or Firm* — Oblon, McClelland, Maier & Neustadt, L.L.P.

(57) ABSTRACT

Provided is an adhesive layer-equipped transparent surface material that can easily be bonded to another surface material (a display panel, etc.) and that, when bonded to another surface material, is less likely to have voids left at the interface between the adhesive layer and another surface material. An adhesive layer-equipped transparent surface material 1 comprises an adhesive layer 14 formed on at least one surface of a protective plate 10 (a transparent surface material), wherein the adhesive layer 14 has a layer portion 18 spreading over the surface of the protective plate 10 and a barrier portion 20 surrounding the periphery of the layer portion 18; and the layer portion 18 has a shear modulus at 35° C. of from 0.5 to 100 kPa.

13 Claims, 6 Drawing Sheets

Related U.S. Application Data continuation of application No. PCT/JP2011/078352, filed on Dec. 7, 2011.

(51) Int. Cl.
- *B32B 7/12* (2006.01)
- *B32B 3/10* (2006.01)
- *B32B 37/14* (2006.01)
- *B32B 37/10* (2006.01)
- *G02F 1/1335* (2006.01)

(52) U.S. Cl.
CPC .................. *B32B 37/14* (2013.01); *C09J 4/00* (2013.01); *B32B 2037/1063* (2013.01); *B32B 2457/202* (2013.01); *G02F 1/133512* (2013.01); *G02F 2202/28* (2013.01); *Y10T 156/10* (2015.01); *Y10T 428/1059* (2015.01); *Y10T 428/1082* (2015.01); *Y10T 428/1462* (2015.01); *Y10T 428/24777* (2015.01)

(58) Field of Classification Search
CPC .............. C09J 2201/28; C09J 2203/318; C09J 2471/00; C09J 7/22; C09J 7/385; B32B 37/10; B32B 37/14; B32B 3/02; B32B 3/10; B32B 7/02; B32B 7/06; B32B 7/12; B32B 2037/1063; B32B 2405/00; B32B 2457/20; B32B 2457/202; B32B 27/06; G02F 1/133512; G02F 2202/28; G02F 2001/133331; Y10T 428/1059; Y10T 428/24777; Y10T 428/1462; Y10T 428/1082; Y10T 156/10; G09F 9/00

See application file for complete search history.

(56) References Cited

U.S. PATENT DOCUMENTS

| | | |
|---|---|---|
| 8,268,447 B2 | 9/2012 | Niiyama et al. |
| 2005/0100820 A1 | 5/2005 | Satake et al. |
| 2007/0134459 A1 | 6/2007 | Hubert et al. |
| 2009/0296033 A1 | 12/2009 | Shinya et al. |
| 2010/0097552 A1 | 4/2010 | Shinya et al. |
| 2010/0189932 A1 | 7/2010 | Niiyama et al. |
| 2010/0215966 A1 | 8/2010 | Ito et al. |
| 2011/0026236 A1 | 2/2011 | Kondo et al. |
| 2011/0033720 A1 | 2/2011 | Fujita et al. |
| 2011/0254790 A1 | 10/2011 | Suzuki et al. |
| 2012/0121914 A1 | 5/2012 | Kadowaki et al. |
| 2012/0288719 A1 | 11/2012 | Niiyama et al. |
| 2013/0273266 A1 | 10/2013 | Niiyama et al. |
| 2014/0178619 A1 | 6/2014 | Niiyama et al. |

FOREIGN PATENT DOCUMENTS

| | | | | |
|---|---|---|---|---|
| JP | 2006-290960 | | 10/2006 | |
| JP | 2009046620 A | * | 3/2009 | |
| JP | 2009046620 A | | 3/2009 | |
| JP | 2009-242602 | | 10/2009 | |
| JP | 2009-263502 | | 11/2009 | |
| JP | 2010-97070 A | | 4/2010 | |
| JP | 2010-163591 A | | 7/2010 | |
| TW | 201000309 A1 | | 1/2010 | |
| WO | WO 2004/035665 A1 | | 4/2004 | |
| WO | WO 2008/007800 A1 | | 1/2008 | |
| WO | WO 2008/081838 A1 | | 7/2008 | |
| WO | WO 2009/016943 A1 | | 2/2009 | |
| WO | WO 2010/016588 A1 | | 2/2010 | |
| WO | WO-2010134547 A1 | * | 11/2010 | ....... B32B 17/10697 |
| WO | WO 2010134547 A1 | | 11/2010 | |
| WO | WO 2011/148990 | | 12/2011 | |

OTHER PUBLICATIONS

International Search Report dated Mar. 27, 2012 in PCT/JP2011/078352 filed Dec. 7, 2011.

Combined Chinese Office Action and Search Report dated Jun. 5, 2014 in Patent Application No. 201180058410.6 (with English language translation).

Lagakos et al., Frequency and temperature dependence of elastic moduli of polymers, Journal of Applied Physics, vol. 59, No. 12, 1986, pp. 4017-4031.

* cited by examiner

Prior Art

Prior Art

ADHESIVE LAYER-EQUIPPED TRANSPARENT SURFACE MATERIAL, DISPLAY DEVICE AND PROCESSES FOR THEIR PRODUCTION

CROSS-REFERENCE TO RELATED APPLICATIONS

The present application is a continuation application of U.S. patent application Ser. No. 13/914,273, filed Jun. 10, 2013, which is in turn a continuation application of International Application No. PCT/JP2011/078352, filed Dec. 7, 2011, which claims priority to Japanese Patent Application No 2010-273720, filed Dec. 8, 2010. The contents of these applications are incorporated herein by reference in their entirety.

TECHNICAL FIELD

The present invention relates to an adhesive layer-equipped transparent surface material, a display device having a display panel protected by the transparent surface material, and processes for their production.

BACKGROUND ART

As a display device having a display panel protected by a transparent surface material (a protective plate), the following one is known. For example, a display device is known wherein a display panel and a protective plate are bonded via an adhesive sheet (Patent Documents 1 and 2).

Bonding of the display panel and the protective plate may be carried out by the following method so that voids will not remain at the interface between the adhesive sheet and the display panel or the protective plate.

For example, the bonding may be carried out by a method wherein the display panel and the protective plate are bonded via an adhesive sheet in a reduced pressure atmosphere, and then the atmosphere is returned to the atmospheric pressure atmosphere.

According to such a method, as shown in FIG. 9, even if an independent void 110 remains at the interface between an adhesive sheet 100 and a display panel 50 or a protective plate 10 at the time when the display panel 50 and the protective plate 10 are bonded via the adhesive sheet 100 in a reduced pressure atmosphere, if the atmosphere is then returned to the atmospheric pressure atmosphere, the volume of the void 110 decreases, and the void 110 will eventually disappear, due to differential pressure between the pressure in the void 110 (the reduced pressure) and the pressure exerted to the adhesive sheet 100 (the atmospheric pressure).

However, as shown in FIG. 10, a void 120 open to exterior is likely to be formed along the periphery of the adhesive sheet 100 in many cases, when the display panel 50 and the protective plate 10 are bonded via the adhesive sheet 100. When the assembly having the display panel 50 and the protective plate 10 bonded via the adhesive sheet 100 in a reduced pressure atmosphere, is returned to the atmospheric pressure atmosphere, the pressure in the void 120 open to exterior is also returned to the atmospheric pressure, whereby the volume of the void 120 will not decrease, and the void 120 will remain.

Further, in such a method, after bonding the adhesive sheet to one of surface materials i.e. the display panel and the protective plate, it is necessary to bond the remaining surface material to the adhesive sheet. That is, the bonding step is required to be carried out twice, whereby the bonding of the display panel and the protective plate becomes cumbersome.

PRIOR ART DOCUMENTS

Patent Documents

Patent Document 1: JP-A-2006-290960
Patent Document 2: JP-A-2009-263502

DISCLOSURE OF INVENTION

Technical Problem

The present invention is to provide an adhesive layer-equipped transparent surface material that can easily be bonded to another surface material (such as a display panel) and that, when bonded to another surface material, is less likely to have voids left at the interface between the adhesive layer and another surface material; a process for producing an adhesive layer-equipped transparent surface material that has formation of voids sufficiently prevented at the interface between the adhesive layer and the transparent surface material, and that can be simply bonded to another surface material and that, when bonded to another surface material, is less likely to have voids left at the interface between the adhesive layer and another surface material; a display device that has formation of voids sufficiently prevented at the interface between the adhesive layer and the display panel; and a process for producing a display device, whereby a display panel and a transparent surface material (a protective plate) can easily be bonded, and voids are less likely to remain at the interface between the adhesive layer and the display panel.

Solution to Problem

The adhesive layer-equipped transparent surface material of the present invention is an adhesive layer-equipped transparent surface material comprising a transparent surface material and an adhesive layer formed on at least one surface of the transparent surface material, wherein the adhesive layer has a layer portion spreading over the surface of the transparent surface material and a barrier portion surrounding the periphery of the layer portion; and the layer portion has a shear modulus at 35° C. of from 0.5 to 100 kPa.

It is preferred that the layer portion is made of a cured product of a layer portion-forming curable resin composition comprising the following curable compound (II) and the following non-curable oligomer (D):

Curable compound (II): at least one curable compound which undergoes a curing reaction at the time of curing the curable resin composition, provided that at least one of said at least one curable compound has a hydroxy group which is not reactive at the time of curing the curable resin composition;

Non-curable oligomer (D): an oligomer which does not undergo a curing reaction with the curable compound (II) at the time of curing the curable composition and which has a hydroxy group.

It is preferred that the curable compound (II) contains a monomer which has a curable group and a hydroxy group.

It is preferred that the curable compound (II) contains an oligomer (A') which has a curable group and has a number average molecular weight of from 1,000 to 100,000, and a monomer (B') which has a curable group and has a molecular weight of from 125 to 600; and the monomer (B')
contains a monomer (B3) having a hydroxy group.

It is preferred that the non-curable oligomer (D) is a polyoxyalkylene polyol, and the oligomer (A') is a urethane oligomer synthesized by using a polyoxyalkylene polyol and a polyisocyanate as raw materials.

It is preferred that the oligomer (A') has an acryl group, and at least a part of the monomer (B') has a methacryl group.

It is preferred that the monomer (B3) contains a hydroxy methacrylate which has a $C_{3-8}$ hydroxyalkyl group having from 1 to 2 hydroxy groups.

It is preferred that the monomer (B') contains a monomer (B4) selected from an alkyl methacrylate having a $C_{8-22}$ alkyl group.

It is preferred that the layer portion-forming curable resin composition does not contain a chain transfer agent, or contains a chain transfer agent in an amount of at most 1 part by mass per 100 parts by mass of the curable compound (II).

It is preferred that the layer portion-forming curable resin composition contains a photo-polymerization initiator (C2), and the curable compound (II) is a photo-curable compound.

It is preferred that the transparent surface material is a protective plate for a display device.

It is preferred that the adhesive layer-equipped transparent surface material further has a removable protective film covering the surface of the adhesive layer.

The process for producing the adhesive layer-equipped transparent surface material of the present invention comprises the following steps (a) to (e):

(a) a step of applying a liquid barrier portion-forming curable composition to a peripheral portion of the surface of the transparent surface material to form an uncured barrier portion, (b) a step of supplying a layer portion-forming curable resin composition to a region surrounded by the uncured barrier portion, (c) a step of overlaying, in a reduced pressure atmosphere of at most 100 Pa, a protective film-bonded supporting surface material on the layer portion-forming curable resin composition so that the protective film is in contact with the layer portion-forming curable resin composition, to obtain a laminate wherein an uncured layer portion made of the layer portion-forming curable resin composition, is sealed by the transparent surface material, the protective film and the uncured barrier portion, (d) a step of curing the uncured layer portion and the uncured barrier portion in a state where the laminate is held in an elevated pressure atmosphere of at least 50 kPa, to form an adhesive layer having a layer portion and a barrier portion, and (e) a step of removing the supporting surface material from the protective film.

The display device of the present invention comprises a display panel and the adhesive layer-equipped transparent surface material of the present invention bonded to the display panel so that the adhesive layer is in contact with the display panel.

It is preferred that the display panel is a liquid crystal display panel of in-plane switching system.

The process for producing the display device of the present invention comprises laminating and bonding, in a reduced pressure atmosphere of at most 100 Pa, the display panel and the adhesive layer-equipped transparent surface material so that the adhesive layer is in contact with the display panel.

Advantageous Effects of Invention

The adhesive layer-equipped transparent surface material of the present invention can easily be bonded to another surface material (such as a display panel) and when bonded to another surface material, is less likely to have voids left at the interface between the adhesive layer and another surface material.

According to the process for producing an adhesive layer-equipped transparent surface material of the present invention, it is possible to produce an adhesive layer-equipped transparent surface material that has formation of voids sufficiently prevented at the interface between the adhesive layer and the transparent surface material, and that can easily be bonded to another surface material and that, when bonded to another surface material, is less likely to have voids left at the interface between the adhesive layer and another surface material.

The display device of the present invention will be one having formation of voids sufficiently prevented at the interface between the adhesive layer and the display panel.

According to the process for producing a display device of the present invention, bonding of a display panel and a transparent surface material (a protective plate) is simple, and voids are less likely to remain at the interface between the adhesive layer and the display panel.

DESCRIPTION OF EMBODIMENTS

In this specification, "transparent" means to have optical transparency, and "(meth)acrylate" means an acrylate or a methacrylate.

<Adhesive Layer-Equipped Transparent Surface Material>

Figure 1:
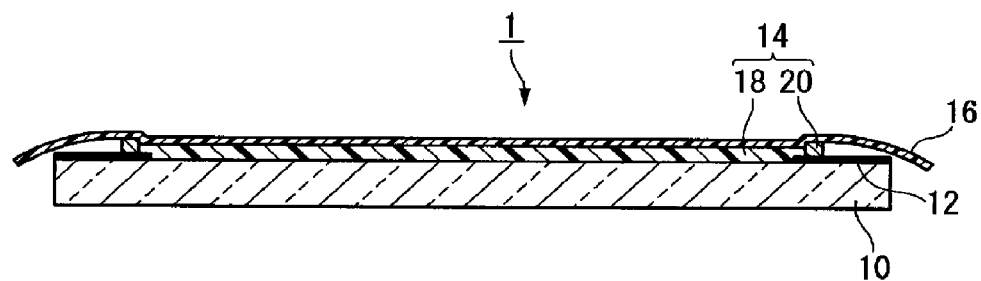
FIG. 1 is a cross-sectional view illustrating an example of the adhesive layer-equipped transparent surface material of the present invention.

FIG. 1 is a cross-sectional view illustrating an example of the adhesive layer-equipped transparent surface material of the present invention.

The adhesive layer-equipped transparent surface material 1 comprises a protective plate 10 (a transparent surface material), a light-shielding printed portion 12 formed at the peripheral portion of the surface of the protective plate 10, an adhesive layer 14 formed on the surface of the protective plate 10 on the side where the light-shielding printed portion 12 is formed, and a removable protective film 16 covering the surface of the adhesive layer 14.

(Protective Plate)

The protective plate 10 is one which is provided on the image display side of the after-described display panel to protect the display panel.

The protective plate 10 may, for example, be a glass plate or a transparent resin plate, and a glass plate is most preferred not only from such a viewpoint that the transparency is high to an emission light or reflection light from a display panel but also from such a viewpoint that it has light resistance, low birefringence, high planarity, surface-scratching resistance and high mechanical strength. A glass plate is preferred also from such a viewpoint that it permits light to sufficiently pass therethrough to cure a photocurable resin composition.

As a material for the glass plate, a glass material such as soda lime glass may be mentioned, and less bluish highly transparent glass having a lower iron content (white plate glass) is more preferred. In order to increase the safety, tempered glass may be used as the surface material. Especially when a thin glass plate is to be used, it is preferred to employ a chemically tempered glass plate.

As a material of the transparent resin plate, a resin material having a high transparency (such as a polycarbonate or a polymethyl methacrylate) may be mentioned.

To the protective plate 10, surface treatment may be applied in order to improve the interfacial adhesion to the adhesive layer 14. The method for such surface treatment may, for example, be a method of treating the surface of the protective plate 10 with a silane coupling agent, or a method of forming a thin film of silicon oxide by an oxidation flame by means of a flame burner.

To the protective plate 10, an antireflection layer may be provided on the surface opposite to the side having the adhesive layer 14 formed, in order to increase the contrast of a display image. The antireflection layer may be provided by a method of directly forming an inorganic thin film on the surface of the protective plate 10 or a method of bonding a transparent resin film provided with an antireflection layer, to the protective plate 10.

Further, depending upon the particular purpose, a part or whole of the protective plate 10 may be colored, a part or whole of the surface of the protective plate 10 may be made to have a frosted glass state to scatter light, or a part or whole of the surface of the protective plate 10 may have fine irregularities, etc. formed to refract or reflect transmitted light. Otherwise, a colored film, a light scattering film, a photorefractive film, a light reflecting film, etc. may be bonded on a part or whole of the surface of the protective plate 10.

The shape of the protective plate 10 is usually rectangular.

Since the process of the present invention is particularly suitable for the production of an adhesive layer-equipped transparent surface material 1 having a relatively large area, the size of the protective plate 10 is preferably at least 0.5 m×0.4 m, particularly preferably at least 0.7 m×0.4 m, in the case of television receivers. The upper limit for the size of the protective plate 10 is determined by the size of the display panel in many cases. Further, a display device with a size being too large tends to be difficult to handle in installation, etc. From such restrictions, the upper limit for the size of the protective plate 10 is usually about 2.5 m×1.5 m.

The thickness of the protective plate 10 is usually from 0.5 to 25 mm in the case of a glass plate from the viewpoint of mechanical strength and transparency. In applications for television receivers, PC displays, etc. to be used indoors, the thickness is preferably from 1 to 6 mm with a view to reducing the weight of a display device, and in applications for public displays to be installed outdoors, it is preferably from 3 to 20 mm. In a case where chemically tempered glass is to be used, the thickness of the glass is preferably from about 0.5 to 1.5 mm from the viewpoint of the strength. In the case of a transparent resin plate, the thickness is preferably from 2 to 10 mm.

(Light-Shielding Printed Portion)

The light-shielding printed portion 12 is one to shield wiring members, etc. connected to a display panel, so that other than the image display region of the after-described display panel is not visible from the protective plate 10 side. The light-shielding printed portion 12 may be formed on the surface of the side having the adhesive layer 14 formed or on the opposite side surface, and with a view to reducing a parallax between the light-shielding printed portion 12 and the image display region, it is preferably formed on the surface of the side where the adhesive layer 14 is to be formed. In a case where the protective plate 10 is a glass plate, it is preferred to use a ceramic printing so that the light-shielding printed portion 12 contains a black pigment, whereby the light shielding property becomes high. In a case where the light-shielding printed portion is to be formed on the side opposite to the side having the adhesive layer formed, a transparent film having the light-shielding printed portion preliminarily provided, may be bonded to the protective plate. A film having a light shielding printed portion provided along the peripheral portion of a transparent film on the side to be bonded to the protective plate and an antireflection layer provided on its rear side i.e. the outermost surface of a display device, may be bonded to the protective plate.

(Adhesive Layer)

The adhesive layer 14 has a layer portion 18 spreading over the surface of the protective plate 10 and a barrier portion 20 surrounding the periphery of the layer portion 18 in contact therewith.

(Layer Portion)

The layer portion 18 is a layer made of a transparent resin formed by curing a liquid layer portion-forming curable resin composition (hereinafter sometimes referred to also as the first composition).

The shear modulus at 35° C. of the layer portion 18 is from 0.5 to 100 kPa, and the lower limit value is preferably 0.8 kPa. The upper limit value is preferably 25 kPa, more preferably 12 kPa. When the shear modulus is at least 0.5 kPa, the shape of the layer portion 18 can be maintained. Further, even in a case where the thickness of the layer portion 18 is relatively thick, the thickness over the entire layer portion 18 can be uniformly maintained, and at the time of bonding an adhesive layer-equipped transparent surface material 1 and a display panel, voids are less likely to be formed at the interface between the display panel and the adhesive layer 14. When the shear modulus is at most 100 kPa, at the time of bonding a display panel and an adhesive layer-equipped transparent surface material 1 in a reduced pressure atmosphere and then returning the atmosphere to an atmospheric pressure atmosphere, voids formed at the interface between the adhesive layer 14 and the display panel will disappear in a short time and are less likely to remain. This is considered to be such that since the molecular mobility of the resin material constituting the layer portion 18 is relatively high, when the display panel and the adhesive layer-equipped transparent surface material 1 are bonded in a reduced pressure atmosphere and then returned to an atmospheric pressure atmosphere, the volume of voids 110 tends to readily decrease due to the differential pressure between the pressure in the voids (reduced pressure) and the pressure exerted to the layer portion 18 (atmospheric pressure).

To determine the shear modulus at 35° C. of the layer portion 18, using a rheometer (modular rheometer Physica MCR-301, manufactured by Anton Paar), a space between a measuring spindle and a light-transmitting plate is adjusted to be the same as the thickness of the layer portion 18, and the uncured first composition is disposed in the space, and while applying heat or light required for curing to the first composition, the shear modulus during the curing process is measured, and the measured value under the curing conditions at the time of forming the layer portion 18 is taken as the shear modulus of the layer portion 18.

(Barrier Portion)

The barrier portion 20 is a portion made of a transparent resin formed by applying and curing a liquid barrier portion-forming curable resin composition (hereinafter sometimes referred to also as the second composition). As the region outside of the image display region of a display panel is relatively narrow, the width of the barrier portion 20 is preferably made narrow. The width of the barrier portion 20 is preferably from 0.5 to 2 mm, more preferably from 0.8 to 1.6 mm.

The thickness of the layer portion 18 is preferably from 0.03 to 2 mm, more preferably from 0.1 to 0.8 mm. When the thickness of the layer portion 18 is at least 0.03 mm, the layer portion 18 is capable of effectively damping an impact, etc. by external force from the protective plate 10 side, thereby to protect the display panel. Further, in the process for producing a display device of the present invention, even if a foreign matter not exceeding the thickness of the layer portion 18 is included between the display panel and the adhesive layer-equipped transparent surface material 1, the thickness of the layer portion 18 will not be substantially changed, and an influence over the optical transparency is little. When the thickness of the layer portion 18 is at most 2 mm, voids are less likely to remain in the layer portion 18, and the entire thickness of the display device will not be unnecessarily thick.

The thickness of the barrier portion 20 is preferably slightly more than the thickness of the layer portion 18 (the difference being at most 20 μm), but the thickness is not limited thereto.

Figure 8:
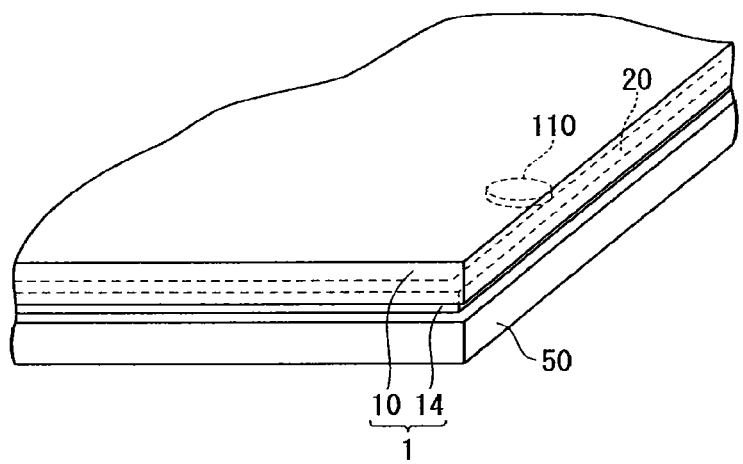
FIG. 8 is a perspective view illustrating the mode of a void at the interface between an adhesive layer and a display panel at the time of bonding the display panel and the adhesive layer-equipped transparent surface material of the present invention.
Figure 9:
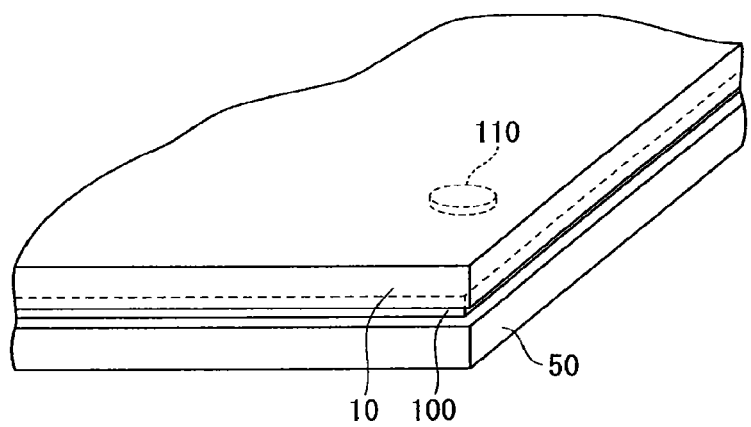
FIG. 9 is a perspective view illustrating the mode of a void at the interface between an adhesive sheet and a display panel at the time when a protective plate and the display panel are bonded via the adhesive sheet.
Figure 10:
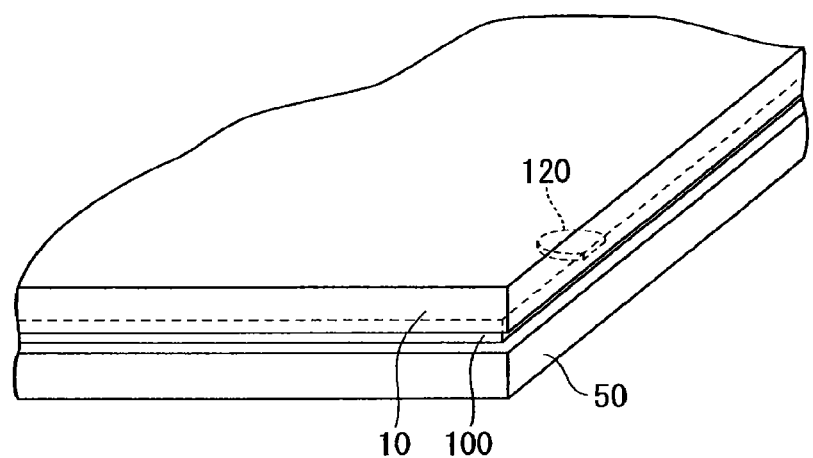
FIG. 10 is a perspective view illustrating the mode of a void at the interface between an adhesive sheet and a display panel at the time when a protective plate and the display panel are bonded via the adhesive sheet.

That is, when the thickness of the barrier portion 20 is more than the thickness of the layer portion 18, at the time of bonding the display panel 50 and the adhesive layer-equipped transparent surface material 1 as shown in FIG. 8, even if a void 110 remains at the interface between the display panel 50 and the adhesive layer 14 at the peripheral portion of the adhesive layer 14, the void 110 is shielded by the barrier portion 20, whereby the void 110 is not open to exterior and becomes an independent void 110. Accordingly, when, after bonding the display panel 50 and the adhesive layer-equipped transparent surface material 1 in a reduced pressure atmosphere, the pressure is returned to the atmospheric pressure atmosphere, the volume of the void 110 will decrease, and the void 110 will eventually disappear, by the differential pressure between the pressure in the void 110 (the reduced pressure) and the pressure exerted to the adhesive layer 14 (the atmospheric pressure).

The thicknesses of the layer portion 18 and the barrier portion 20 can be adjusted by the amounts of the liquid first composition and second composition to be supplied to the surface of the protective plate 10 and the respective shrinkages at the time of their curing.

The polymerization shrinkage of the first composition (the layer portion-forming curable resin composition) to be used in the present invention becomes low as the content of the non-curable oligomer increases. Accordingly, the polymerization shrinkage of the second composition becomes relatively high, and there may be a case where the thickness of the barrier portion 20 becomes less than the thickness of the layer portion 18.

In a case where a void open to exterior is formed at the interface between the adhesive layer and another surface material due to such a situation that the thickness of the barrier portion 20 is equal to the layer portion 18 or less than the layer portion 18, a method for overcoming such a drawback may, for example, be a method wherein at the time of curing the layer portion 18 and the barrier portion 20, a supporting surface material 36 having a difference in level provided on the lower surface is mounted in order to make the upper surface of the layer portion 18 after the curing to be lower than the upper surface of the barrier portion 20, or a method wherein at the time of forming the second composition into a barrier-form, the second composition is supplied to the surface of the protective plate 10 so that it becomes larger than the thickness after curing, and further, before supplying the first composition, light to cure the second composition is applied for a short time to partially cure or thicken the second composition to secure the thickness of the barrier portion. In a case where prior to supplying the first composition, the second composition is partially cured, it is preferred to form the line width of the barrier portion 20 to be fine, so that the barrier portion can easily be deformed at the time of lamination with the after-described supporting surface material.

(Supporting Surface Material)

Figure 6:
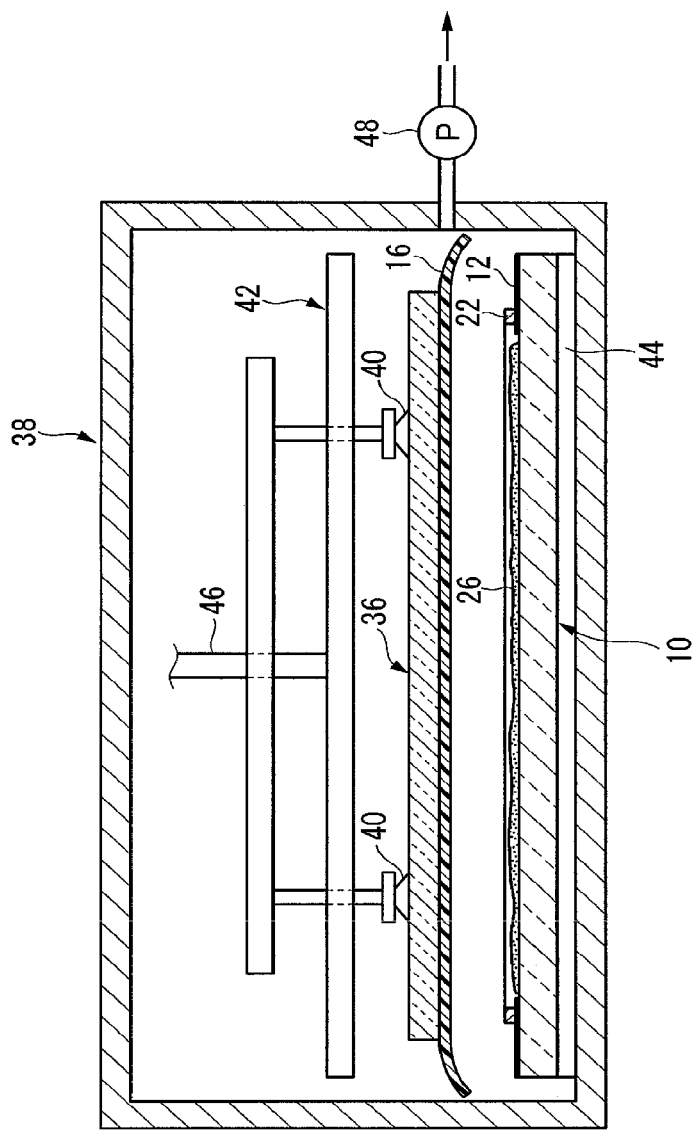
FIG. 6 is a cross-sectional view illustrating an example of the mode in step (c).

The supporting surface material 36 shown in FIG. 6, to be used in the after-described process of the present invention, is a transparent surface material such as a glass plate or a resin plate. In a case where a supporting surface material 36 having a relatively large area is to be used, if the supporting surface material 36 has warpage or defection, the surface state of the adhesive layer 14 may be adversely affected, and therefore, it is preferred to employ a glass plate having higher rigidity. Further, in a case where a glass plate is employed as the supporting surface material 36, the thickness of the glass plate is preferably from 0.5 to 10 mm. If the thickness is less than 0.5 mm, warpage or deflection is likely to occur, and if it is thicker than 10 mm, the mass of the supporting surface material 36 becomes unnecessarily large, and the supporting surface material 36 is likely to be displaced at the time of moving the laminate before curing the adhesive layer 14. The thickness is particularly preferably from 1.0 to 5.0 mm.

(Protective Film)

The protective film 16 is required to be not firmly bonded to the adhesive layer 14 and to be able to be bonded to the supporting surface material 36 in the after-described process of the present invention. Therefore, the protective film 16 is preferably a self-adhesive protective film such that one surface of a substrate film having a relatively low adhesion such as a polyethylene, a polypropylene or a fluorinated resin, is made to be an adhesive surface.

The adhesive force of the adhesive surface of the protective film 16 is preferably from 0.01 to 0.1 N, more preferably from 0.02 to 0.06 N, by a test specimen with a width of 50 mm in a 180° C. peeling test at a peeling rate of 300 mm/min against an acrylic plate. When the adhesive force is at least 0.01 N, bonding to the supporting surface material 36 is possible, and when it is at most 0.1 N, it is easy to peel the protective film 16 from the supporting surface material 36.

A preferred thickness of the protective film 16 may vary depending upon the resin to be used, but in a case where a relatively flexible film of e.g. polyethylene or polypropylene is to be used, the thickness is preferably from 0.04 to 0.2 mm, more preferably from 0.06 to 0.1 mm. When it is at least 0.04 mm, it is possible to prevent deformation of the protective film 16 at the time of peeling the protective film 16 from the adhesive layer 14, and when the thickness is at most 0.2 mm, the protective film 16 is likely to be deflected at the time of peeling, and can easily be peeled.

Further, it is also possible to further facilitate peeling from the adhesive layer 14 by providing a rear surface layer on the back surface opposite to the adhesive surface of the protective film 16. Also for such a rear surface layer, it is preferred to employ a film having relatively low adhesion made of e.g. a polyethylene, a polypropylene or a fluorinated resin. In order to further facilitate the peeling, it is also possible to apply a release agent such as silicone to the adhesive layer 14 within a range not to present an adverse effect.

Bonding of the protective film 16 to the supporting surface material 36 is carried out by bonding the protective film 16 which is supplied as a rolled material to the supporting surface material 36 by means of e.g. a rubber roll. At that time, in order to avoid formation of voids between the supporting surface material 36 and the adhesive surface of the protective film 16, the rubber roll may be pressed against the supporting surface material 36, or the bonding is carried out in a reduced pressure atmosphere.

It is preferred to employ a protective film 16 slightly larger than the supporting surface material 36, so that the ends of the protective film 16 can easily be gripped at the time of peeling from the adhesive layer 14.

OTHER EMBODIMENTS

The illustrated adhesive layer-equipped transparent surface material 1 is an example wherein the transparent surface material is a protective plate for a display device. However, the adhesive layer-equipped transparent surface material of the present invention is not limited to the illustrated one and may be any material so long as the specific adhesive layer is formed on at least one surface of the transparent surface material.

For example, the adhesive layer-equipped transparent surface material of the present invention may be one wherein the specific adhesive layer is formed on both surfaces of the transparent surface material.

Further, it may be one wherein a polarizing means (such as a film-form absorption-type polarizer or a wire grid-type polarizer) or an optical modulator means (such as a phase difference film such as a ¼ retardation sheet, or a stripe-patterned phase difference film) is provided between the transparent surface material (the protective plate) and the specific adhesive layer.

<Process for Producing Adhesive Layer-Equipped Transparent Surface Material>

The process for producing the adhesive layer-equipped transparent surface material of the present invention is a process comprising the following steps (a) to (e):

(a) a step of applying a liquid barrier portion-forming curable composition to a peripheral portion of the surface of the transparent surface material to form an uncured barrier portion, (b) a step of supplying a layer portion-forming curable resin composition to a region surrounded by the uncured barrier portion, (c) a step of overlaying, in a reduced pressure atmosphere of at most 100 Pa, a protective film-bonded supporting surface material on the layer portion-forming curable resin composition so that the protective film is in contact with the layer portion-forming curable resin composition, to obtain a laminate wherein an uncured layer portion made of the layer portion-forming curable resin composition, is sealed by the transparent surface material, the protective film and the uncured barrier portion, (d) a step of curing the uncured layer portion and the uncured barrier portion in a state where the laminate is held in an elevated pressure atmosphere of at least 50 kPa, to form an adhesive layer having a layer portion and a barrier portion, and (e) a step of removing the supporting surface material from the protective film.

The process of the present invention is a process wherein in a reduced pressure atmosphere, the liquid first composition is sealed in between the transparent surface material and the protective film bonded to the supporting surface material, and in a high pressure atmosphere such as an atmospheric pressure atmosphere, the sealed first composition is cured to form a layer portion. Sealing of the first composition under reduced pressure is not a method of injecting the layer portion-forming curable resin into a shallow wide space between the transparent surface material and the protective film bonded to the supporting surface material, but a method of supplying the first composition substantially over the entire surface of the transparent surface material, and then, the protective film bonded to the supporting surface material is overlaid to seal in the first composition between the transparent surface material and the protective film bonded to the supporting surface material.

An example of the method for producing a transparent laminate by sealing a liquid curable resin composition under reduced pressure and curing the curable resin composition in an atmospheric pressure atmosphere, is known. For example, WO2008/81838 and WO2009/16943 disclose a process for producing such a transparent laminate and a curable resin composition to be used in such a process, which are incorporated in this specification by reference.

(Step (a))

Firstly, a liquid second composition is applied to the peripheral portion of the surface of the transparent surface material to form an uncured barrier portion. The application is carried out by means of e.g. a printing machine or a dispenser.

The barrier portion prior to being cured in step (d), may have an interfacial adhesion of at least a level whereby the liquid first composition will not leak out from the interface between the uncured barrier portion and the transparent surface material and at the interface between the uncured barrier portion and the protective film, and may have a hardness of a level whereby the shape can be maintained. For example, it is preferred that the barrier portion is formed by using a second composition having a high viscosity.

Otherwise, the same composition as the first composition to be used for forming the layer portion may be applied to the peripheral portion of the surface of the transparent surface material and semi-cured, and such a semi-cured composition may be used as the barrier portion prior to being cured in step (d).

The viscosity of the second composition is preferably from 500 to 3,000 Pa·s, more preferably from 800 to 2,500 Pa·s, further preferably from 1,000 to 2,000 Pa·s. When the viscosity is at least 500 Pa·s, the shape of the uncured barrier portion can be maintained for a relatively long period of time, and the height of the uncured barrier portion can be sufficiently maintained. When the viscosity is at most 3,000 Pa·s, the uncured barrier portion can be formed by coating.

The viscosity of the second composition is measured at 25° C. by means of an E-model viscometer.

Further, in order to maintain the distance between the transparent surface material and the display panel, spacer particles having a predetermined particle diameter may be incorporated to the second composition.

It is preferred that after application of the liquid second composition, light to cure the second composition is applied for a short time to partially cure or thicken the second composition, whereby the shape of the barrier portion may better be maintained.

The second composition may be a photo-curable resin composition or a heat curable resin composition. As the second composition, a photocurable resin composition comprising a curable compound and a photopolymerization initiator (C) is preferred since the curing can be carried out at a low temperature, and the curing speed is high. Further, a high temperature is not required for the curing, and therefore, the display panel is less likely to be damaged by a high temperature.

Otherwise, the same composition as the first composition to be used for forming the layer portion may be applied along the peripheral portion of the surface of the transparent surface material and semi-cured, and such a semi-cured composition may be used as the barrier portion prior to being cured in step (d).

A barrier portion-forming photocurable resin composition which is preferred as the second composition in the present invention, will be described.

[Barrier Portion-Forming Photocurable Resin Composition]

The barrier portion-forming photocurable resin composition is a liquid composition comprising a photocurable compound (I) and a photopolymerization initiator (C1).

(Curable Compound (I))

The curable compound (I) preferably comprises at least one oligomer (A) having a curable group and having a number average molecular weight of 30,000 to 100,000 and at least one monomer (B) having a curable group and having a molecular weight of from 125 to 600.

The curable group in the oligomer (A) or the monomer (B) may, for example, be an addition-polymerizable unsaturated group (such as an acryloyloxy group or a methacryloyloxy group), or a combination of an unsaturated group and a thiol group, and it is preferably a group selected from an acryloyloxy group and a methacryloyloxy group in that the curing speed is high and a barrier layer having high transparency can be obtained.

The curable group in the oligomer (A) and the curable group in the monomer (B) may be the same or different from each other. The curable group in the oligomer (A) having a relatively high molecular weight tends to have a lower reactivity than the curable group in the monomer (B) having a relatively low molecular weight, and accordingly, curing of the monomer (B) is likely to advance, whereby the viscosity of the entire composition is likely to be increased rapidly, and the curing reaction tends to be non-uniform. In order to minimize the difference in the reactivity of the curable groups of both and to obtain a homogeneous barrier portion, the curable group of the oligomer (A) may be selected to be an acryloyloxy group having a relatively high reactivity, and the curable group of the monomer (B) may be selected to be a methacryloyloxy group having a relatively low reactivity.

The number average molecular weight of the oligomer (A) is from 30,000 to 100,000, preferably from 40,000 to 80,000, more preferably from 50,000 to 65,000. When the number average molecular weight of the oligomer (A) is within such a range, the viscosity of the barrier portion-forming photocurable resin composition can easily be adjusted to be within the above-mentioned range.

The number average molecular weight of the oligomer (A) is a number average molecular weight as calculated as polystyrene, obtained by the measurement by GPC (gel permeation chromatography). Here, in the measurement by GPC, in a case where a peak of the unreacted low molecular weight component (such as a monomer) appears, the number average molecular weight is obtained by excluding such a peak.

The molecular weight of the monomer (B) is from 125 to 600, preferably from 140 to 400, more preferably from 150 to 350. When the molecular weight of the monomer (B) is at least 125, volatilization of the monomer (B) can be prevented at the time of producing a display device by the after-described reduced pressure lamination method. When the molecular weight of the monomer (B) is at most 600, it is possible to increase the solubility of the monomer (B) in the high molecular weight oligomer (A), and it is possible to suitably carry out the viscosity adjustment as the barrier portion-forming photocurable resin composition.

(Oligomer (A))

The oligomer (A) is preferably one having an average of from 1.8 to 4 curable groups per one molecule from the viewpoint of the curing property of the barrier portion-forming photocurable resin composition and the mechanical properties of the barrier portion.

The oligomer (A) may, for example, be a urethane oligomer having a urethane bond, a poly(meth)acrylate of a polyoxyalkylene polyol, or a poly(meth)acrylate of a polyester polyol.

From such a viewpoint that the mechanical properties of the resin after curing, the adhesion with a surface material, etc. can widely be adjusted by the molecular weight design of the urethane chain, etc., a urethane oligomer prepared by using a polyol and a polyisocyanate as raw materials, is preferred, and the after-described urethane oligomer (A1) is more preferred. As the polyol, a polyoxyalkylene polyol is more preferred.

(Urethane Oligomer (A1))

A urethane oligomer (A1) having a number average molecular weight within a range of from 30,000 to 100,000 becomes to have a high viscosity, and it is difficult to synthesize by a usual method, and even if it can be synthesized, mixing it with the monomer (B) is difficult.

Therefore, it is preferred that the urethane oligomer (A1) is synthesized by a synthetic method using a monomer (B) (the following monomers (B1) and (B2)), and then, the obtained product is used as it is, as the barrier portion-forming photocurable resin composition, or the obtained product is further diluted with the monomer (B) (the following monomer (B1), (B3), etc.) and used as the barrier portion-forming photocurable resin composition.

(1) Monomer (B1): Among monomers (B), a monomer having a curable group and not having a group reactive with an isocyanate group.

(2) Monomer (B2): Among monomers (B), a monomer having a curable group and having a group reactive with an isocyanate group.

(3) Monomer (B3): Among monomers (B), a monomer having a curable group and having a hydroxy group.

Synthetic Method for Urethane Oligomer (A1):

A method wherein in the presence of the monomer (B1) as a diluent, a polyol and a polyisocyanate are reacted to obtain a prepolymer having an isocyanate group, and then, the monomer (B2) is reacted to the isocyanate group of the prepolymer.

The polyol and the polyisocyanate may be known compounds, e.g. the polyol (i) and the diisocyanate (ii), disclosed as raw materials for a urethane type oligomer (a) in WO2009/016943, which are incorporated in this specification by reference.

The polyol (i) may, for example, be a polyoxyalkylene polyol such as polyoxyethylene glycol or polyoxypropylene diol, a polyester polyol, a polycarbonate polyol, etc. Among them, a polyoxyalkylene polyol is preferred, and polyoxypropylene polyol is particularly preferred. It is further preferred that some of oxypropylene groups in the polyoxypropylene polyol are substituted by oxyethylene groups, whereby the compatibility of the barrier portion-forming photocurable composition with other components, can be increased.

The isocyanate (ii) is preferably a diisocyanate selected from an aliphatic diisocyanate, an alicyclic diisocyanate and a non-yellowing aromatic diisocyanate. Among them, examples of the aliphatic polyisocyanate include hexamethylene diisocyanate, 2,2,4-trimethyl-hexamethylene diisocyanate, 2,4,4-trimethyl-hexamethylene diisocyanate, etc. Examples of the alicyclic polyisocyanate include isophorone diisocyanate, methylene bis(4-cyclohexyl isocyanate), etc. The non-yellowing aromatic diisocyanate may, for example, be xylylene diisocyanate, etc. One of them may be used alone, or two or more of them may be used in combination.

The monomer (B1) may, for example, be an alkyl (meth) acrylate having a $C_{8-22}$ alkyl group (such as n-dodecyl (meth)acrylate, n-octadecyl (meth)acrylate or n-behenyl (meth)acrylate), or a (meth)acrylate having an alicyclic hydrocarbon group (such as isobornyl (meth)acrylate or adamantyl (meth)acrylate).

The monomer (B2) may, for example, be a monomer having active hydrogen (a hydroxy group, an amino group, etc.) and a curable group. Specifically, a hydroxy alkyl (meth)acrylate having a $C_{2-6}$ hydroxyalkyl group (such as 2-hydroxyethyl (meth)acrylate, 2-hydroxypropyl (meth) acrylate, 2-hydroxybutyl (meth)acrylate or 4-hydroxybutyl (meth)acrylate) may, for example, be mentioned, and a hydroxyalkyl acrylate having a $C_{2-4}$ hydroxyalkyl group is preferred.

(Monomer (B))

The monomer (B) is preferably one having from 1 to 3 curable groups per one molecule from the viewpoint of the curing property of the barrier portion-forming photocurable resin composition and the mechanical properties of the barrier portion.

The barrier portion-forming photocurable resin composition may contain, as the monomer (B), the monomer (B1) which is used as a diluent in the above-describe synthetic method for the urethane oligomer (A1). Further, it may contain, as the monomer (B), an unreacted monomer (B2) which is used in the above-described synthetic method for the urethane oligomer (A1).

The monomer (B) preferably contains the monomer (B3) having a hydroxy group from the viewpoint of the adhesion between the transparent surface material and the barrier portion or the solubility of the after-described various additives.

As the monomer (B3) having a hydroxy group, a hydroxy methacrylate having from 1 to 2 hydroxy groups and a $C_{3-8}$ hydroxyalkyl groups (such as 2-hydroxypropyl methacrylate, 2-hydroxybutyl methacrylate, 4-hydroxybutyl methacrylate or 6-hydroxyhexyl methacrylate) is preferred, and 2-hydroxybutyl methacrylate is particularly preferred.

The content of the monomer (B) in the barrier portion-forming photocurable resin composition is preferably from 15 to 50 mass %, more preferably from 20 to 45 mass %, further preferably from 25 to 40 mass %, in the entirety (100 mass %) of the curable compound (I) i.e. the total (100 mass %) of the oligomer (A) and the monomer (B). When the content of the monomer (B) is at least 15 mass %, the curing property of the barrier portion-forming photocurable resin composition and the adhesion between the surface material and the barrier portion will be good. When the content of the monomer (B) is at most 50 mass %, the viscosity of the barrier portion-forming photocurable resin composition can easily be adjusted to be at least 500 Pa·s.

Further, in the synthesis of the urethane oligomer (A1), the monomer (B2) reacted with the isocyanate group of the prepolymer is present as a part of the oligomer (A) and therefore is not included in the content of the monomer (B) in the barrier portion-forming photocurable resin composition. On the other hand, the monomer (B1) used as a diluent in the synthesis of the urethane oligomer (A1) and the monomer (B) added after the synthesis of the urethane oligomer (A1) are included in the content of the monomer (B) in the barrier portion-forming photocurable resin composition.

(Photopolymerization Initiator (C1))

As the photopolymerization initiator (C1) to be contained in the barrier portion-forming photocurable resin composition, a photopolymerization initiator of e.g. acetophenone type, ketal type, benzoin or benzoin ether type, phosphine oxide type, benzophenone type, thioxanthone type, a quinone type or the like may be mentioned, and a photopolymerization initiator of acetophenone type, ketal type or benzoin ether type is preferred. In a case where curing is carried out by means of a short wavelength visible light, a photopolymerization initiator of phosphine oxide type is more preferred from the viewpoint of the absorption wavelength region. By using two or more photopolymerization initiators (C1) different in the absorption wavelength region in combination, it is possible to further accelerate the curing time or to increase the surface hardness at the barrier portion.

The content of the photopolymerization initiator (C1) in a barrier portion-forming photocurable resin composition is preferably from 0.01 to 10 parts by mass, more preferably from 0.1 to 5 parts by mass, per 100 parts by mass of the entire curable compound (I) i.e. the total of the oligomer (A) and the monomer (B).

(Additives)

The barrier portion-forming photocurable resin composition may contain various additives such as a polymerization inhibitor, a photo-curing accelerator, a chain extender, a light stabilizer (such as an ultraviolet absorber or a radical scavenger), an antioxidant, a flame retardant, an adhesion-improving agent (such as a silane coupling agent), a pigment, a dye, etc., as the case requires, and it preferably contains a polymerization inhibitor, a light stabilizer, etc. Particularly, when a polymerization inhibitor is contained in an amount smaller than the polymerization initiator, it is possible to improve the stability of the barrier portion-forming photocurable resin composition and to adjust the molecular weight of the layer portion after curing.

As the polymerization inhibitor, a polymerization inhibitor of e.g. hydroquinone type (such as 2,5-di-tert-butylhydroquinone), catechol type (such as p-tert-butylcatechol), anthraquinone type, phenothiazine type or hydroxy toluene type may be mentioned.

As the light stabilizer, an ultraviolet absorber (such as benzotriazole type, benzophenone type or salicylate type) or a radical scavenger (such as hindered amine type) may, for example, be mentioned.

As the antioxidant, a phosphorus type or sulfur type compound may be mentioned.

The total amount of such additives is preferably at most 10 parts by mass, more preferably at most 5 parts by mass, per 100 parts by mass of the entire curable compound (I) i.e. the total of the oligomer (A) and the monomer (B).

(Step (b))

After step (a), a liquid first composition is supplied to a region surrounded by the uncured barrier portion.

In the present invention, the barrier portion in the steps (b) and (c) being "uncured" means that the barrier portion is not entirely cured, and one having partially cured or thickened by preliminarily applying light to the barrier portion for a short time, is also included in the "uncured" barrier portion.

The amount of the first composition to be supplied is preliminarily set to be such an amount that the space formed by the uncured barrier portion, the transparent surface material and the protective film is filled by the first composition, and the distance between the transparent surface material and the protective film is adjusted to be a prescribed distance (i.e. the layer portion is adjusted to have the prescribed thickness). At that time, it is desirable that a volume decrease due to the curing shrinkage of the first composition is taken into account. Accordingly, such an amount is preferably an amount such that the thickness of the first composition becomes slightly thicker than the prescribed thickness of the layer portion.

As the supplying method, a method may be mentioned wherein the transparent surface material is placed to be flat, and the composition is supplied in a dot, line or strip pattern by a supplying means such as a dispenser or a die coater.

The viscosity of the first composition is preferably from 0.05 to 50 Pa·s, more preferably from 1 to 20 Pa·s. When the viscosity is at least 0.05 Pa·s, it is possible to suppress the proportion of the after-described monomer (B'), and thereby to prevent deterioration of the physical properties of the layer portion. Further, as the low boiling point component decreases, such being advantageous for the after-described reduced pressure lamination method. When the viscosity is at most 50 Pa·s, air bubbles tend to less likely to remain in the layer portion.

The viscosity of the first composition is measured at 25° C. by means of an E-model viscometer.

The first composition may be a photocurable resin composition or a heat-curable resin composition. As the first composition, a photocurable resin composition comprising a curable compound and a photopolymerization initiator (C') is preferred from such a viewpoint that curing can be made at a low temperature, and the curing speed is high. Further, a high temperature is not required for the curing, and the display panel is less likely to be damaged by a high temperature.

The layer portion-forming photocurable resin composition to be used as the first composition in the present invention will be described.

[Layer Portion-Forming Photocurable Resin Composition]

The layer portion-forming photocurable resin composition is a liquid composition comprising a photocurable compound (II), a photopolymerization initiator (C2) and a non-curable oligomer (D). The non-curable oligomer (D) is an oligomer having a hydroxy group which does not undergo a curing reaction with the curable compound (II) in the composition at the time of curing the layer portion-forming photocurable resin composition.

(Curable Compound (II))

The curable compound (II) in the layer portion-forming photocurable resin composition is composed of at least one curable compound which undergoes a curing reaction at the time of curing the layer portion-forming photocurable resin composition, and at least one of said at least one curable compound is a compound (IIa) having a hydroxy group which is not reactive at the time of curing the layer portion-forming photocurable resin composition.

When the curable compound (II) contains such a compound (IIa), hydroxy groups will be present in a cured product obtained by a curing reaction of the curable compound (II) alone. The presence of such hydroxy groups contributes to the stabilization of the non-curable oligomer in the layer portion-forming photocurable resin composition.

Therefore, the compound (IIa) having a hydroxy group which is not reactive at the time of curing may be one such that unreacted hydroxy groups remain after the curing reaction, and for example, some of hydroxy groups in the compound (IIa) may undergo a curing reaction, so long as the rest of hydroxy groups will remain in an unreacted state without undergoing a curing reaction.

Such a compound (IIa) having a hydroxy group which is not reactive at the time of curing may be one having a hydroxy group as well as a curable group which contributes to the curing reaction, and it may be a monomer or an oligomer having repeating units. With a view to facilitating the adjustment of the viscosity of the photocurable composition in an uncured state, it is preferred to use, as the compound (IIa), a monomer having a curable group and a hydroxy group.

The curable compound (II) preferably comprises at least one oligomer (A') having a curable group and having a number average molecular weight of from 1,000 to 100,000, and at least one monomer (B') having a curable group and having a molecular weight of from 125 to 600. By using such a curable compound (II), the viscosity of the layer portion-forming photocurable resin composition can easily be adjusted to be within the above-mentioned preferred range.

In such a case, it is preferred to use, as at least a part of the monomer (B'), a monomer (B3) having a curable group and a hydroxy group and having a molecular weight of from 125 to 600.

The curable group in the oligomer (A') or the monomer (B') may, for example, be an addition-polymerizable unsaturated group (such as an acryloyloxy group or a methacryloyloxy group), or a combination of an unsaturated group and a thiol group, and a group selected from an acryloyloxy group and a methacryloyloxy group is preferred from such a viewpoint that the curing speed is high, and a layer portion having high transparency is obtainable.

The curable group in the oligomer (A') and the curable group in the monomer (B') may be the same or different from each other. The curable group in the oligomer (A') having a relatively high molecular weight tends to have a lower reactivity than the curable group in the monomer (B') having a relatively low molecular weight, whereby curing of the monomer (B') tends to advance, and the viscosity of the entire composition is likely to rapidly increase, so that the curing reaction tends to be non-uniform. In order to minimize the difference in the reactivity between the two curable groups and to obtain a uniform layer portion, it is more preferred that the curable group in the oligomer (A') is selected to be an acryloyloxy group having a relatively high reactivity, and the curable group in the monomer (B') is selected to be a methacryloyloxy group having a relatively low reactivity.

(Oligomer (A'))

The number average molecular weight of the oligomer (A') is from 1,000 to 100,000, preferably from 10,000 to 70,000. When the number average molecular weight of the oligomer (A') is within such a range, the viscosity of the layer portion-forming photocurable resin composition can easily be adjusted to be within the above-mentioned range.

The number average molecular weight of the oligomer (A') is a number average molecular weight as calculated as polystyrene, obtained by the measurement by GPC. Further, in the measurement by GPC, in a case where a peak of an unreacted low molecular weight component (such as a monomer) appears, the number average molecular weight is obtained by excluding such a peak.

The oligomer (A') is preferably one having an average of from 1.8 to 4 curable groups per one molecule from the viewpoint of curing property of the layer portion-forming photocurable resin composition and the mechanical properties of the layer portion.

The oligomer (A') may, for example, be a urethane oligomer having a urethane bond, a poly(meth)acrylate of a polyoxyalkylene polyol, or a poly(meth)acrylate of a polyester polyol, and a urethane oligomer (A2) is preferred from such a viewpoint that the mechanical properties of the resin after curing, the adhesion to the surface material, etc. can widely be adjusted by e.g. molecular design of the urethane chain.

The urethane oligomer (A2) is preferably one to be synthesized by a method wherein a polyol and a polyisocyanate are reacted to obtain a prepolymer having an isocyanate group, and then, the above monomer (B2) is reacted to the isocyanate group of the prepolymer.

The polyol and the polyisocyanate may be known compounds, e.g. the polyol (i) and the diisocyanate (ii) disclosed as raw materials for a urethane type oligomer (a) disclosed in WO2009/016943, which are incorporated in this specification by reference.

The content of the oligomer (A') is preferably from 20 to 90 mass %, more preferably from 30 to 80 mass %, in the entirety (100 mass %) of the curable compound (II) i.e. the total (100 mass %) of the oligomer (A') and the monomer (B'). When the content of the oligomer (A') is at least 20 mass %, the heat resistance of the layer portion becomes good. When the content of the oligomer (A') is at most 90 mass %, the curing property of the layer portion-forming photocurable resin composition and the adhesion between the surface material and the layer portion become good.

(Monomer (B'))

The molecular weight of the monomer (B') is from 125 to 600, preferably from 140 to 400. When the molecular weight of the monomer (B') is at least 125, volatilization of the monomer can be prevented at the time of producing a display device by the after-described reduced pressure lamination method. When the molecular weight of the monomer (B') is at most 600, the adhesion between the surface material and the layer portion becomes good.

The monomer (B') is preferably one having from 1 to 3 curable groups per one molecule from the viewpoint of the curing property of the layer portion-forming photocurable resin composition and the mechanical properties of the layer portion.

The content of the monomer (B') is preferably from 10 to 80 mass %, more preferably from 20 to 70 mass % in the entirety (100 mass %) of the curable compound (II) i.e. the total (100 mass %) of the oligomer (A') and the monomer (B'). The monomer (B') preferably contains a monomer (B3) having a curable group and a hydroxy group. The monomer (B3) contributes to stabilization of the non-curable oligomer (D). Further, when the monomer (B3) is contained, good adhesion between the transparent surface material and a layer portion tends to be readily obtainable.

As the monomer (B3) having a hydroxy group, the same one as the monomer (B3) in the barrier portion-forming photocurable resin composition may be mentioned, and 2-hydroxybutyl methacrylate is particularly preferred.

The content of the monomer (B3) is preferably from 10 to 60 mass %, more preferably from 20 to 50 mass %, in the entirety (100 mass %) of the curable compound (II) i.e. the total (100 mass %) of the oligomer (A') and the monomer (B'). When the content of the monomer (B3) is at least 10 mass %, it is readily possible to sufficiently obtain the effects to improve the stability of the layer portion-forming photocurable resin composition and to improve the adhesion between the surface material and the layer portion.

The monomer (B') preferably contains the following monomer (B4). The monomer (B4) contributes to shortening of the time from bonding the display panel and the adhesive layer-equipped transparent surface material in a reduced pressure atmosphere to disappearance of voids formed in the adhesive layer after returning the atmosphere to an atmospheric pressure atmosphere.

On the other hand, if the monomer (B4) is contained, the time required for curing the layer portion-forming photocurable resin composition tends to be long.

Monomer (B4): At least one member selected from alkyl methacrylates having a $C_{8-22}$ alkyl group.

The monomer (B4) may, for example, be n-dodecyl methacrylate, n-octadecyl methacrylate or n-behenyl methacrylate, and n-dodecyl methacrylate or n-octadecyl methacrylate is preferred.

The content of the monomer (B4) is preferably from 5 to 50 mass %, more preferably from 15 to 40 mass %, in the entirety (100 mass %) of the curable compound (II) i.e. the total (100 mass %) of the oligomer (A') and the monomer (B'). When the content of the monomer (B4) is at least 5 mass %, an adequate effect of adding the monomer (B4) is easily obtainable.

Further, in the mass ratio of the content of the monomer (B4) to the content of the monomer (B3) having a hydroxy group, the larger the proportion of the monomer (B4), the better to let voids formed in the adhesive layer readily disappear at the time of bonding the display panel and the adhesive layer-equipped transparent surface material in a reduced pressure atmosphere and then returning the atmosphere to the atmospheric pressure atmosphere, and the upper limit value in the range of the shear modulus of the layer portion tends to be slightly higher.

For example, in a case where the layer portion-forming photocurable resin composition contains the monomer (B3) having a hydroxy group and the monomer (B4) having an alkyl group, the content of the monomer (B4) is from 0.6 to 2.5 to 1 of the content (based on mass) of the monomer (B3), and no chain transfer agent is contained, the shear modulus of the layer portion is more preferably from 0.8 to 25 kPa, particularly preferably from 0.8 to 12 kPa.

Further, addition of a chain transfer agent contributes to an increase of the upper limit value of the preferred range of the shear modulus of the layer portion. For example, in a case where the layer portion-forming photocurable resin composition contains a chain transfer agent in a range of at most 1 part by mass per 100 parts by mass of the entire curable compound (II), and the content of the monomer (B4) is smaller than the monomer (B3), the shear modulus of the layer portion is more preferably from 0.8 to 12 kPa, particularly preferably from 0.8 to 6 kPa.

In a case where the content of the monomer (B4) is from 1 to 3 to 1 of the content (based on mass) of the monomer (B3), and a chain extender is contained in a range of at most 1 part by mass per 100 parts by mass of the entire curable compound (II), the shear modulus of the layer portion is more preferably from 0.8 to 75 kPa, particularly preferably from 0.8 to 12 kPa.

(Photopolymerization Initiator (C2))

As the photopolymerization initiator (C2) contained in the layer portion-forming photocurable resin composition, a photopolymerizable initiator of e.g. acetone type, ketal type, benzoin or benzoin ether type, phosphine oxide type, benzophenone type, thioxanthone type or quinone type may be mentioned, and a photopolymerization initiator of phosphine oxide type or thioxanthone type is preferred. With a view to preventing coloration after the photopolymerization reaction, phosphine oxide type is particularly preferred.

The content of the photopolymerization initiator (C2) in the layer portion-forming photocurable resin composition is preferably from 0.01 to 10 parts by mass, more preferably from 0.1 to 5 parts by mass, per 100 parts by mass of the entirety of the curable compound (II) i.e. the total of the oligomer (A') and the monomer (B').

(Non-Curable Oligomer (D))

The non-curable oligomer (D) is an oligomer which does not undergo a curing reaction with the curable compound (II) in the composition at the time of curing the layer portion-photocurable resin composition and which has a hydroxy group.

The number of hydroxy groups per one molecule of the non-curable oligomer (D) is preferably from 0.8 to 3, more preferably from 1.8 to 2.3.

The number average molecular weight (Mn) per one hydroxy group of the non-curable oligomer (D) is preferably from 400 to 8,000. When the number average molecular weight per one hydroxy group is at least 400, the polarity of the non-curable oligomer (D) will not be too high, and good compatibility with the curable compound (II) in the layer portion-forming photocurable resin composition is readily obtainable. When the number average molecular weight per one hydroxy group is at most 8,000, it is readily possible to obtain the effect to stabilize the non-curable oligomer (D) in the layer portion after curing by an interaction between the hydroxy group derived from the curable compound (II) and the hydroxy group of the non-curable oligomer (D). It is considered that a hydrogen bond contributes to such an interaction.

One of such non-curable oligomers (D) may be used alone, or two or more of them may be used in combination.

As an example of the non-curable oligomer (D) having a hydroxy group, a polyol having a high molecular weight may, for example, be mentioned, and a polyoxyalkylene polyol, a polyester polyol or a polycarbonate polyol is preferred.

The polyoxyalkylene polyol may, for example, be a polyoxyalkylene diol such as polyoxyethylene glycol, polyoxypropylene diol, polyoxypropylene triol or polyoxytetramethylene glycol.

The number average molecular weight (Mn) per one hydroxy group of the polyoxyalkylene polyol is preferably from 400 to 8,000, more preferably from 600 to 5,000.

The polyester polyol may be an aliphatic polyester diol having a residual group of an aliphatic diol such as ethylene glycol, propylene glycol or 1,4-butanediol and a residual group of an aliphatic dicarboxylic acid such as glutaric acid, adipic acid or sebacic acid.

The polycarbonate polyol may be an aliphatic polycarbonate diol having a diol residual group such as 1,6-hexanediol, or an aliphatic polycarbonate diol such as a ring-opened polymer of an alicyclic carbonate.

The number average molecular weight (Mn) per one hydroxy group of the polyester polyol or the polycarbonate polyol is preferably from 400 to 8,000, more preferably from 800 to 6,000.

In this specification, the number average molecular weight of the non-curable oligomer (D) is a value calculated by the following formula (1) from the hydroxy value A (KOH mg/g) measured in accordance with JIS K1557-1 (2007 edition) and the number B of hydroxy groups in one molecule of the non-curable oligomer (D).

$$\text{Molecular weight of non-curable oligomer } (D) = 56.1 \times B \times 1{,}000/A \tag{1}$$

From such a viewpoint that the elastic modulus of the layer portion after curing can easily be made lower, it is preferred to use, as the non-curable oligomer (D), a polyoxyalkylene polyol, and a polyoxypropylene polyol is particularly preferred. Further, some of oxypropylene groups in the polyoxypropylene polyol may be substituted by oxyethylene groups.

For example, from the viewpoint of the compatibility, it is preferred that the oligomer (A') is a urethane oligomer synthesized by using a polyoxyalkylene polyol and a polyisocyanate as raw materials, and the non-curable oligomer (D) is a polyoxyalkylene polyol.

In the present invention, in order to stabilize the layer portion-forming photocurable resin composition in an uncured state and to prevent separation of the non-curable oligomer (D) from the layer portion after curing, it is preferred that the oligomer (A') and the non-curable oligomer (D) have molecular chains having the same or similar structures.

Specifically, it is preferred not only to use compound having a hydroxy group such as a polyol (hereinafter sometimes referred to also as a hydroxy group-containing compound) as a raw material at the time of synthesizing the oligomer (A') in the layer portion-forming photocurable resin composition, but also to use the same hydroxy group-containing compound as the non-curable oligomer (D).

For example, in a case where the oligomer (A') is a urethane oligomer synthesized by using a polyoxyalkylene polyol and a polyisocyanate as raw materials, it is preferred to use such a polyoxyalkylene polyol as the non-curable oligomer (D).

Otherwise, in a case where the hydroxy group-containing compound as a raw material for the oligomer (A') and the hydroxy group-containing compound to be used as the non-curable oligomer (D) are not the same, it is preferred to adjust so that the molecular chains of both have partially common structures such as common repeating units, and the polarities of both are made to be substantially equal. The method for adjusting the polarity may, for example, be a method of introducing a polar group to increase the polarity, a method of substituting some of oxypropylene groups by oxyethylene groups to increase the polarity, or a method of reducing the molecular weight per one hydroxy group to increase the polarity. A combination of these methods may also be used.

For example, in a case where the oligomer (A') is a urethane oligomer synthesized by using a polyoxypropylene polyol (a') having some of oxypropylene groups substituted by oxyethylene groups, and a polyisocyanate, as raw materials, it is preferred to use, as the non-curable oligomer (D), a polyoxypropylene polyol which is a polyoxypropylene polyol having no oxyethylene group and which has a molecular weight per one hydroxy group being smaller than the above polyol (a').

One example of the most preferred layer portion-forming photocurable resin composition may be a composition comprising, as the oligomer (A') a urethane oligomer (A2) obtainable by reacting a polyisocyanate compound with a polyoxypropylene diol having some of oxypropylene groups substituted by oxyethylene groups to obtain a prepolymer having an isocyanate group, followed by a reaction with the above monomer (B2), as the non-curable oligomer (D) a polyoxypropylene diol having some of oxypropylene groups substituted by oxyethylene groups, which is the same as the raw material for the urethane oligomer (A2), and as the monomer (B') a monomer (B3) having a hydroxy group.

Thus, it is considered that if the oligomer (A') partially has the same molecular structure as the non-curable oligomer (D), the compatibility of the non-curable oligomer (D) in the compound is further increased, and further, as the monomer (B') has a hydroxy group, the non-curable oligomer (D) can be stably present in the cured product due to the interaction between the hydroxy group in the molecular structure after curing the curable compound (II) and the hydroxy group in the molecular structure of the non-curable oligomer (D).

Further, as another example, also in the case of a composition comprising as the oligomer (A') a urethane oligomer (A2) obtainable by reacting a polyisocyanate compound with a polyoxypropylene diol having some of oxypropylene groups substituted by oxyethylene groups to obtain a prepolymer having an isocyanate group, followed by a reaction with the above monomer (B2), as the non-curable oligomer (D) a polyoxypropylene diol not substituted by oxyethylene groups and having a molecular weight smaller than the oxypropylene diol as the raw material for the urethane oligomer (A2), and as the monomer (B') a monomer (B3) having a hydroxy group, it is possible to obtain good compatibility of the non-curable oligomer (D) in the composition, and it is possible to let the non-curable oligomer (D) be present stably in the cured product.

If the content of the non-curable oligomer (D) in the layer portion-forming photocurable resin composition increases, the shear modulus of the layer portion tends to decrease. On the other hand, if the content of the non-curable oligomer (D) is too much, curing of the layer portion in the adhesive layer tends to be inadequate. If the curing of the layer portion is inadequate, it is likely to be difficult to peel the protective film from the adhesive layer after curing.

Therefore, the content of the non-curable oligomer (D) in the layer portion-forming photocurable resin composition is preferably set within a range of from 10 to 70 mass % in the entirety (100 mass %) of the layer portion-forming photocurable resin composition also in consideration of the balance with other components in order not to cause such problems.

For example, in a case where the layer portion-forming photocurable resin composition comprises the above monomer (B3) having a hydroxy group and the monomer (B4) having an alkyl group, wherein the content of the monomer (B4) is from 0.6 to 2.5 per 1 of the content (based on mass) of the monomer (B3), and no chain extender is contained, the content of the non-curable oligomer (D) is preferably from 30 to 70 mass %, more preferably from 40 to 70 mass %, in the entirety (100 mass %) of the layer portion-forming photocurable resin composition.

Further, also addition of a chain extender contributes to reducing the shear modulus of the layer portion. In a case where the layer portion-forming photocurable resin composition contains a chain extender within a range of at most 1 part by mass per 100 parts by mass of the entire curable compound (II), and the content of the monomer (B4) is less than the monomer (B3), the content of the non-curable oligomer (D) is preferably from 40 to 70 mass %, more preferably from 50 to 70 mass %, in the entirety of the layer portion-forming photocurable resin composition.

In a case where the content of the monomer (B4) is from 1 to 3 per 1 of the content (based on mass) of the monomer (B3), and a chain extender is contained within a range of at most 1 part by mass per 100 parts by mass of the entire curable compound (II), the content of the non-curable oligomer (D) is preferably from 5 to 55 mass %, more preferably from 10 to 50 mass %, further preferably from 35 to 50 mass %, in the entirety of the layer portion-forming photocurable resin composition.

If the monomer (B4) or the chain extender is added, the curing speed tends to be slow, and from such a viewpoint, the content thereof should better be small. In a case where the mass ratio of the content of the monomer (B4) to 1 of the content (based on mass) of the monomer (B3) is less than 0.6, and no chain extender is contained, the content of the non-curable oligomer (D) is preferably from 40 to 70 mass %, more preferably from 50 to 70 mass %.

(Additives)

In addition to the curable compound (II), the non-curable oligomer (D) and the photopolymerization initiator (C), the layer portion-forming photocurable resin composition may contain, as the case requires, various additives such as a polymerization inhibitor, a photo-curing accelerator, a chain extender, a light stabilizer (such as an ultraviolet absorber or a radical scavenger), an antioxidant, a flame retardant, an adhesion-improving agent (such as a silane coupling agent), a pigment, a dye, etc. and it is preferred that the composition contains a polymerization inhibitor, a light stabilizer, etc. Especially when a polymerization inhibitor is contained in an amount smaller than the polymerization initiator, it is possible to improve the stability of the layer portion-forming photocurable resin composition, and it is possible to adjust the molecular weight of the layer portion after curing.

The total amount of such additives is preferably at most 10 parts by mass, more preferably at most 5 parts by mass, per 100 parts by mass of the entirety of the curable compound (II) i.e. the total of the oligomer (A') and the monomer (B').

Among additives, the chain extender is preferably not contained or contained only in a small amount with a view to obtaining a good curing speed. When a chain extender is contained, the shear modulus of the layer portion tends to decrease, whereby it becomes possible to reduce the amount of the non-curable oligomer (D) required to bring the shear modulus of the layer portion to a preferred value. If the amount of the non-curable oligomer (D) is small, the difference in the curing shrinkage between the barrier portion and the layer portion tends to be small.

In a case where a chain extender is contained, its amount is preferably at most 1 part by mass, more preferably at most 0.5 part by mass, per 100 parts by mass of the entirety of the curable compound (II) i.e. the total of the oligomer (A') and the monomer (B').

(Step (c))

After step (b), the transparent surface material having the first composition supplied thereto is put in a pressure reducing device, and the transparent surface material is placed flatly on a fixed support platen in the pressure reducing device so that the surface of the first composition faces upward.

At an upper portion in the pressure reducing device, a vertically movable support mechanism is provided, and a supporting surface material (such as a glass plate) is attached to the movable support mechanism. On the lower surface of the supporting surface material, a protective film is bonded.

The supporting surface material is located at a position above the transparent surface material and not to contact with the first composition. That is, the first composition on the transparent surface material and the protective film on the surface of the supporting surface material are permitted to face each other without being in contact with each other.

Here, the vertically movable support mechanism may be provided at a lower portion in the pressure reducing device, and the transparent surface material having the first composition supplied thereto, may be placed on the movable support mechanism. In such a case, the supporting surface material may be attached to the fixed support platen provided at an upper portion in the pressure reducing device, so that the transparent surface material and the supporting surface material face each other.

Otherwise, both the transparent surface material and the supporting surface material may be supported by the movable support mechanisms provided at the upper and lower portions in the pressure reducing device.

After placing the transparent surface material and the supporting surface material at the predetermined positions, the interior of the pressure reducing device is evacuated to form a predetermined reduced pressure atmosphere. If possible, during the pressure reducing operation or after forming a predetermined reduced pressure atmosphere, the transparent surface material and the supporting surface material may be moved to the predetermined position in the pressure reducing device.

After the interior of the pressure reducing device becomes a predetermined reduced pressure atmosphere, the supporting surface material supported by the movable support mechanism is moved downward, and the supporting surface material having a protective film bonded thereto is overlaid on the first composition on the to transparent surface material so that the protective film is in contact with the first composition.

By such overlaying, the first composition is sealed in a space enclosed by the surface of the transparent surface material, the surface of the protective film bonded to the supporting surface material and the uncured barrier portion.

At the time of overlaying, the first composition is pressed and spread by the self weight of the supporting surface material and the pressing pressure from the movable support mechanism, etc., and the first composition is filled in the above space to form an uncured layer portion. Thereafter, at the time of exposure to a high pressure atmosphere in step (d), an uncured layer portion having no or little voids will be formed.

The reduced pressure atmosphere at the time of overlaying is at most 100 Pa, preferably from 10 to 100 Pa, more preferably from 15 to 40 Pa. If the reduced atmosphere is too much low pressure, an adverse effect is likely to be given to various components (such as a curable compound, a photopolymerization initiator, a polymerization inhibitor, a chain extender, a light stabilizer, etc.) contained in the first composition. For example, if the reduced pressure atmosphere is too low pressure, the respective components are likely to volatize, and it may take time to provide a reduced pressure atmosphere.

The period of time from the time when the transparent surface material and the supporting surface material are laminated to the release of the reduced pressure atmosphere, is not particularly limited, and after sealing the first composition, the reduced pressure atmosphere may immediately be released, or after sealing the first composition, the reduced pressure state may be maintained for a predetermined period of time. By maintaining the reduced pressure state for a predetermined period of time, the first composition flows in the sealed space, whereby the distance between the transparent surface material and the protective film bonded to the supporting surface material becomes uniform, and it becomes easy to maintain the sealed state even if the pressure of the atmosphere is increased. The period of time to maintain the reduced pressure state may be a long time of at least a few hours, but from the viewpoint of the production efficiency, it is preferably within one hour, more preferably within 10 minutes.

In the process of the present invention, in a case where a second composition having a high viscosity is applied to form an uncured barrier portion, the thickness of the first composition in the laminate obtained in step (c) can be made to be relatively thick at a level of from 0.03 to 2 mm.

(Step (d))

After releasing the reduced pressure atmosphere in step (c), the laminate is held in an elevated pressure atmosphere of at least 50 kPa.

When the laminate is held in an elevated pressure atmosphere of at least 50 kPa, by the elevated pressure, the transparent surface material and the supporting surface material are pressed in the direction for adhesion, whereby if voids are present in the sealed space in the laminate, an uncured layer portion will flow in the voids, and the entire sealed space will be uniformly filled with an uncured layer portion.

The elevated pressure atmosphere is usually from 80 to 120 kPa. The elevated pressure atmosphere may be an atmospheric pressure atmosphere or an atmosphere under a higher pressure. An atmospheric pressure atmosphere is most preferred in that an operation such as curing of the uncured layer portion can be carried out without requiring any special installation.

The period of time (hereinafter referred to as the high pressure retention time) from the time when the laminate is held under an elevated pressure atmosphere of at least 50 kPa to the initiation of curing of the uncured layer portion, is not particularly limited. In a case where a process of taking out the laminate from the pressure reducing device, transferring it to a curing device and initiating the curing, is carried out in an atmospheric pressure atmosphere, the time required for the process becomes the high pressure retention time. Therefore, in a case where at the time when the laminate is placed in an atmospheric air atmosphere, voids are no longer present in the sealed space of the laminate, or in a case where voids have disappeared during the process, the uncured layer portion can immediately be cured. In a case where it takes time until voids will disappear, the laminate is held in an atmosphere under a pressure of at least 50 kPa until voids will disappear. Further, even if the high retention time becomes long, usually, there will no trouble, and therefore, the high pressure retention time may be prolonged depending upon other necessities for the process. The high temperature retention time may be as long as more than one day, but from the viewpoint of the production efficiency it is preferably within 6 hours, more preferably within one hour, particularly preferably within 10 minutes, since the production efficiency will be higher.

Then, by curing the uncured layer portion and the uncured barrier portion, an adhesive layer having a layer portion and a barrier portion will be formed. At that time, the uncured barrier portion may be cured at the same time as curing the uncured layer portion, or may preliminarily be cured prior to curing the uncured layer portion.

In a case where the uncured layer portion and the uncured barrier portion are made of photocurable compositions, curing is carried out by applying light. For example, from a light source (such as an ultraviolet lamp, a high pressure mercury lamp or UV-LED) ultraviolet light or visible light with a short wavelength is applied to cure the photocurable resin compositions.

The light is preferably ultraviolet light or visible light with a wavelength of at most 450 nm.

In a case where a light-shielding printed portion is formed along the peripheral portion of the transparent surface material, or in a case where an antireflection layer is provided on the transparent surface material, and such an antireflection layer or a transparent resin film having such an antireflection layer formed or the adhesive layer provided between the antireflection film and the transparent surface material, will not permit ultraviolet ray to pass therethrough, light is applied from the side of the supporting surface material.

In a case where the uncured layer portion is made of a photocurable composition and if sufficiently photo-cured, a suitable shear modulus of elasticity will not be obtainable, application of light may be stopped during the curing to form the layer portion, and after bonding it to another surface material (a display panel), the layer portion may be irradiated again with light or heated to accelerate the curing of the layer portion. In a case where the curing is accelerated by heating, a very small amount of a thermal polymerization initiator may be incorporated to the photocurable composition. Even in a case where a thermal polymerization initiator is not incorporated, by maintaining heating after an incomplete photocuring, the cured state of the layer portion can be stabilized, such being preferred. The process of the present invention is carried out usually at a low temperature at which a film is durable, such being advantageous from the viewpoint of the protection of the protective film.

(Step (e))

The supporting surface material is removed from the protective film to obtain an adhesive layer-equipped transparent surface material wherein an adhesive layer having a sufficient adhesion is preliminarily formed on a transparent surface material, and formation of voids at the interface between the transparent surface material and the adhesive layer is sufficiently prevented.

Specific Example

Now, the process for producing an adhesive layer-equipped transparent surface material 1 in FIG. 1 will be specifically described with reference to the drawings.

(Step (a))

Figure 2:
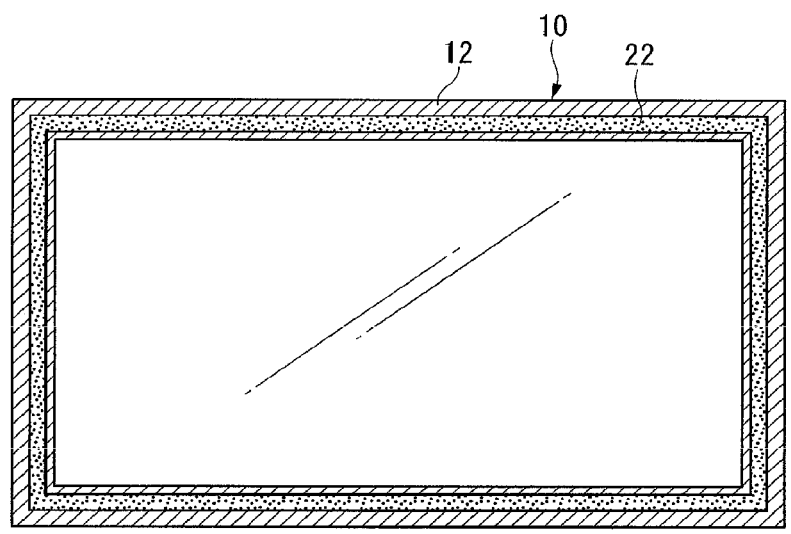
FIG. 2 is a plan view illustrating an example of the mode in step (a).
Figure 3:
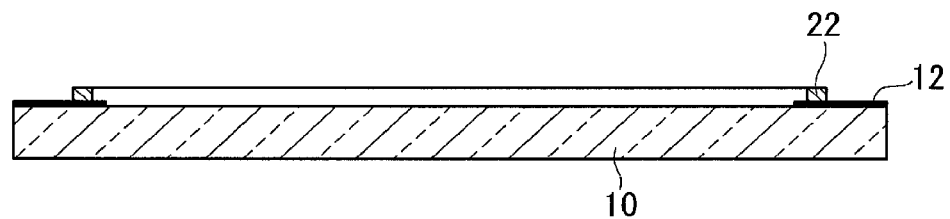
FIG. 3 is a cross-sectional view illustrating an example of the mode in step (a).

As shown in FIGS. 2 and 3, a barrier portion-forming photocurable resin composition is applied by a dispenser (not shown) or the like along a light-shielding printed portion 12 at the peripheral portion of a protective plate 10 (a transparent surface material).

(Step (b))

Figure 4:
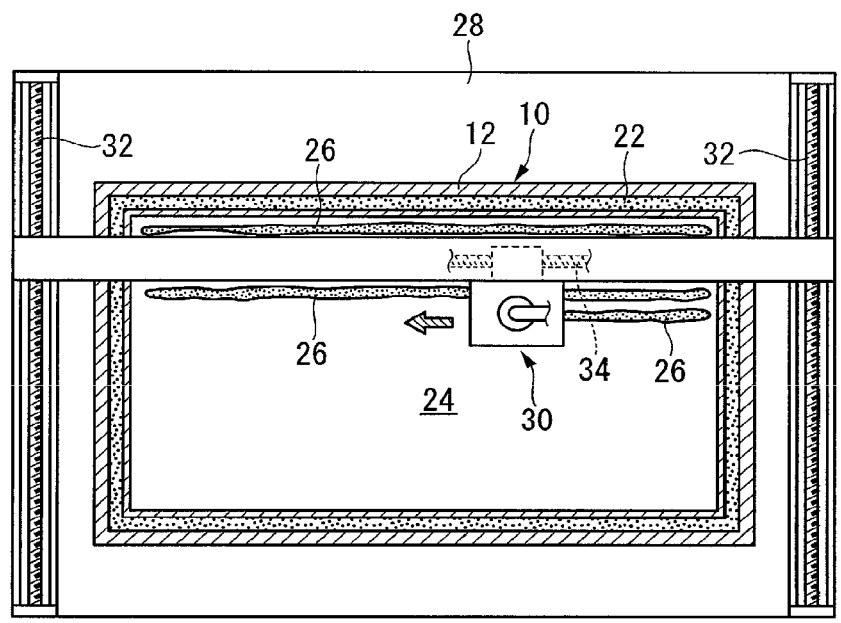
FIG. 4 is a plan view illustrating an example of the mode in step (b).
Figure 5:
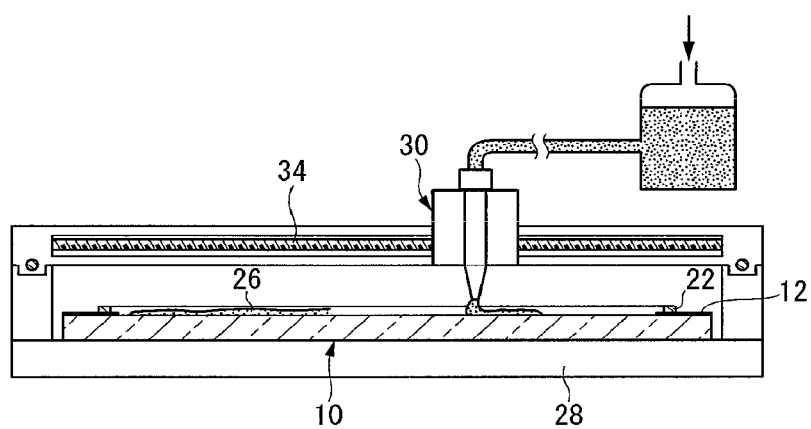
FIG. 5 is a cross-sectional view illustrating an example of the mode in step (b).

Then, as shown in FIGS. 4 and 5, a layer portion-forming photocurable resin composition 26 is supplied to a rectangular region 24 surrounded by an uncured barrier portion 22 on the protective plate 10. The amount of the layer portion-forming photocurable resin composition 26 to be supplied, is preliminarily set to be an amount such that the space to be sealed by the uncured barrier portion 22, the protective plate 10 and the protective film 16 (see FIG. 6), is filled by the layer portion-forming photocurable resin composition 26.

Supplying of the layer portion-forming photocurable resin composition 26 is carried out in such a manner that as shown in FIGS. 4 and 5, the protective plate 10 is placed flatly on the lower platen 28, and by means of a horizontally moving dispenser 30, the layer portion-forming photocurable resin composition 26 is supplied in a line, strip or dot-form.

The dispenser 30 is made to be horizontally movable in the entire range of the region 24 by a known horizontal movement mechanism comprising a pair of feed screws 32 and a feed screw 34 perpendicular to the feed screws 32. Here, instead of the dispenser 30, a die coater may be used.

(Step (c))

Then, as shown in FIG. 6, the protective plate 10 and the supporting surface material 36 having the protective film 16 bonded thereto, are brought in a pressure reducing device 38. At an upper portion in the pressure reducing device 38, an upper platen 42 having a plurality of suction pads 40 is disposed, and at a lower portion, a lower platen 44 is provided. The upper platen 42 is made to be vertically movable by an air cylinder 46.

The supporting surface material 36 is attached to the suction pads 40 so that the surface having the protective film 16 bonded thereto faces downward. The protective plate 10 is fixed on the lower platen 44 so that the surface having the layer portion-forming photocurable resin composition 26 supplied thereto faces upward.

Then, the air in the pressure reducing device 38 is suctioned by a vacuum pump 48. After the atmosphere pressure in the pressure reducing device 38 has reached, for example, a reduced pressure atmosphere of from 15 to 40 Pa, the air cylinder 46 is operated to let the supporting surface material 36 descend towards the protective plate 10 waiting below, in such a state as suction-held by suction pads 40 of the upper platen 42. And, the protective plate 10 and the supporting surface material 36 having the protective film 16 bonded thereto, are laminated via the uncured barrier portion 22 to constitute a laminate wherein the uncured layer portion made of the layer portion-forming photocurable resin composition 26 is sealed by the protective plate 10, the protective film 16 and the uncured barrier portion 22, and the laminate is maintained in a reduced pressure atmosphere for a predetermined period of time.

The attaching position of the protective plate 10 to the lower platen 44, the number of suction pads 40, the attaching position of the supporting surface material 36 to the upper platen 42, etc. are suitably adjusted depending upon the sizes, shapes, etc. of the protective plate 10 and the supporting surface material 36. At that time, by using electrostatic chucks as the suction pads and adopting the electrostatic chuck-holding method as disclosed in WO2010/016588 (which is incorporated in this specification by reference), the supporting surface material 36 can be held stably in a reduced pressure atmosphere.
(Step (d))

Then, inside of the pressure reducing device 38 is made to be e.g. an atmospheric pressure atmosphere, and then, the laminate is taken out from the pressure reducing device 38. When the laminate is placed in an atmospheric pressure atmosphere, the surface on the protective plate 10 side and the surface on the supporting surface material 36 side of the laminate are pressed by the atmospheric pressure, whereby the uncured layer portion in the sealed space is pressed by the protective plate 10 and the supporting surface material 36. By such a pressure, the uncured layer portion in the sealed space will flow, and the entire sealed space will be uniformly filled with the uncured layer portion.

Then, from the supporting surface material 36 side, light (ultraviolet light or visible light with a short wavelength) is applied to the uncured barrier portion 22 and the uncured layer portion to cure the uncured barrier portion 22 and the uncured layer portion in the laminate thereby to form an adhesive layer having a layer portion and a barrier portion.
(Step (e))

Then, the supporting surface material 36 is removed from the protective film 16 to obtain an adhesive layer-equipped transparent surface material 1.

Advantageous Effects

According to the process for producing an adhesive layer-equipped transparent surface material of the present invention, it is possible to produce an adhesive layer-equipped transparent surface material having a relatively large area without forming voids at the interface between the adhesive layer and the transparent surface material or the protective film. Even if voids remain in the uncured layer portion sealed under reduced pressure, the volume of such voids decreases, and the voids will easily disappear in a high temperature atmosphere before curing, as the pressure is exerted also to the sealed uncured layer portion. For example, the volume of a gas in voids in the uncured layer portion sealed under 100 Pa is considered to become 1/1,000 under 100 kPa. The gas may be dissolved in the uncured layer portion, and the gas in voids having a very small volume will readily be dissolved in the uncured layer portion and will disappear.

Further, as compared with a method (an injection method) of injecting a flowable curable resin composition into a space in a shallow and a wide area between two sheets of surface materials, formation of voids is less, and the first composition can be filled in a short time. Yet, there is little restriction with respect to the viscosity of the first composition, and the first composition having a high viscosity can easily be filled. Therefore, it is possible to employ a first composition having a high viscosity containing a curable compound having a relatively high molecular weight which is likely to reduce the shear modulus of the layer portion.

In the adhesive layer-equipped transparent surface material of the present invention, an adhesive layer is preliminarily formed on at least one surface of a transparent surface material, whereby the step of bonding with another surface material (such as a display panel) may be only once, and bonding with another surface material (such as a display panel) is simple.

Further, the adhesive layer comprises a layer portion spreading over the surface of the transparent surface material and a barrier portion surrounding the periphery of the layer portion, whereby the thickness of the layer portion 18 can easily be made uniform. In the absence of such a barrier portion, the peripheral portion of the layer portion tends to be thin as compared with the center portion. As the uniformity in thickness of the layer portion 18 is high, formation of voids can well be prevented at the time of bonding a display panel and the adhesive layer-equipped transparent surface material.

Further, when the display panel and the adhesive layer-equipped transparent surface material are bonded in a reduced pressure atmosphere and then returned to an atmospheric pressure atmosphere, the volume of voids will decrease, and the voids will disappear, by the differential pressure between the pressure (reduced pressure) in the voids formed at the interface between the adhesive layer and the display panel and the pressure (atmospheric pressure) exerted to the adhesive layer.

At that time, if it takes a long time until the voids disappear, there may be a case where it becomes difficult to confirm the bonding quality in the bonding step. However, in the adhesive layer-equipped transparent surface material of the present invention, the shear modulus of the layer portion is within a specific range, whereby the molecular mobility of the layer portion in contact with voids can easily be increased, whereby such voids will disappear in a short time, whereby the quality control is easy, and the productivity is high, such being desirable.

Further, the layer portion is supported by the transparent surface material (such as a glass plate), and the shape can sufficiently be maintained even if the shear modulus is at a low value within the range of the present invention.

Further, according to the present invention, a relatively thick adhesive layer can be formed while maintaining the uniformity of the thickness, on the surface of the transparent surface material having a large area, whereby with the obtainable adhesive layer-equipped transparent surface material, formation of voids can sufficiently be prevented even when bonded to another surface material (such as a display panel) having a large area which is likely to be deflected.

Further, when it has a removable protective film covering the surface of the adhesive layer, the shape of the adhesive layer can sufficiently be maintained until immediately before being bonded to the display panel.

The adhesive layer-equipped transparent surface material as described in the foregoing, is suitable as a protective plate for a display device.

<Display Device>

Figure 7:
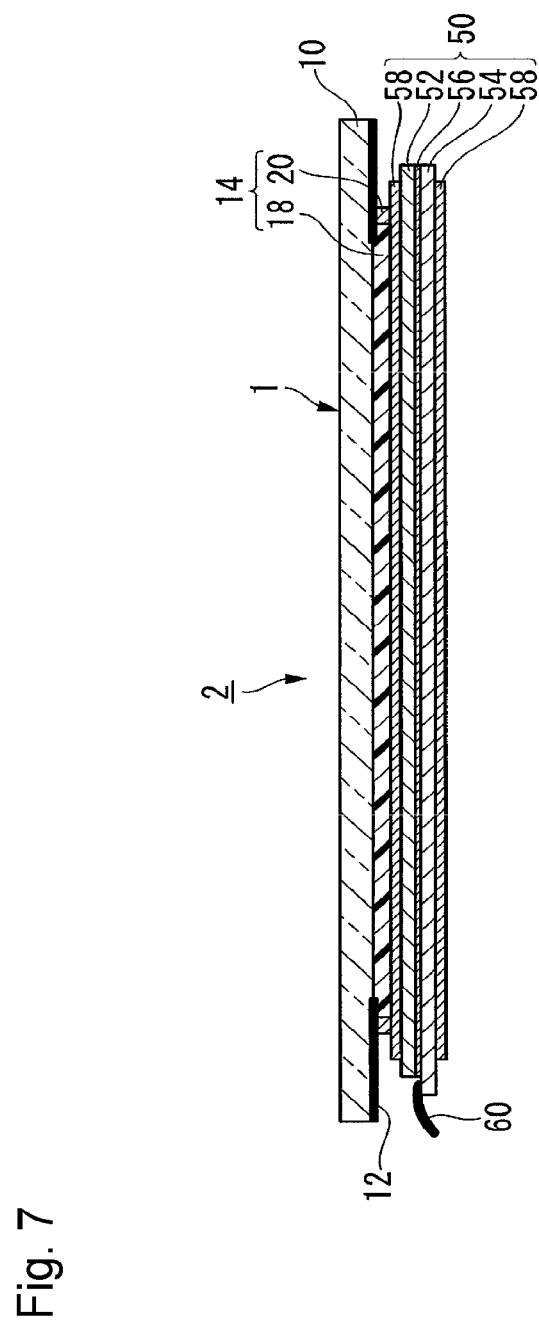
FIG. 7 is a cross-sectional view illustrating an example of the display device of the present invention.

FIG. 7 is a cross-sectional view illustrating an example of the display device of the present invention.

The display device 2 comprises a display panel 50 and an adhesive layer-equipped transparent surface material 1 bonded to the display panel 50 so that the adhesive layer 14 is in contact with the display panel 50.

The display device 2 has a protective plate 10, the display panel 50, a layer portion 18 sandwiched by the protective plate 10 and the display panel 50, a barrier portion 20 surrounding the periphery of the layer portion 18, and a flexible printed circuit board 60 (FPC) connected to the display panel 50 and having a driving IC mounted which drives the display panel 50.

(Display Panel)

The illustrated display panel 50 is an example of a liquid crystal panel having a construction wherein a transparent substrate 52 provided with a color filter and a transparent substrate 54 provided with TFT (a thin film transistor) are bonded via a liquid crystal layer 56, and this assembly is sandwiched between a pair of polarizing plates 58, but the display panel in the present invention is not limited to the illustrated one.

The display panel is one wherein a display material of which the optical state changes by an external electrical signal, is sandwiched between a pair of electrodes, of which at least one is a transparent electrode. Depending upon the type of the display material, it may, for example, be a liquid crystal panel, an EL panel, a plasma panel, an electron ink type panel or the like. Further, the display panel has a structure wherein a pair of surface materials, of which at least one is a transparent substrate, are bonded to each other, and is disposed so that the transparent substrate side is in contact with the layer portion. At that time, in some display panels, an optical film such as a polarizing plate or retardation film may be provided on the outermost layer side of the transparent substrate in contact with the layer portion. In such a case, the layer portion serves to bond the protective plate and the optical film on the display panel.

To the bonding surface of the display panel to be bonded to the layer portion, surface treatment may be applied to improve the interfacial bond strength with the barrier portion. Such surface treatment may be only along the peripheral portion or may be over the entire surface of the surface material. The surface treatment method may, for example, be a method of treating with a low temperature-processable bonding primer.

The thickness of the display panel is usually from 0.4 to 4 mm in the case of a liquid crystal panel to be driven by TFT, or usually from 0.2 to 3 mm in the case of an EL panel.
(Shape)

The shape of the display device is usually rectangular.

The size of the display device is suitably at least 0.5 m×0.4 m, particularly preferably at least 0.7 m×0.4 m in the case of a television receiver using a liquid crystal panel, since the process of the present invention is particularly suitable for the production of a display device having a relatively large area. The upper limit for the size of the display device is determined by the size of the display panel in many cases. Further, if the display device is too large, the handling in e.g. installation tends to be difficult. From such restrictions, the upper limit for the size of the display device is usually about 2.5 m×1.5 m.

The sizes of the protective plate and the display panel may be substantially equal, but from the relation with another casing to accommodate the display device, the protective plate is slightly larger than the display panel in many cases. Inversely, however, depending upon the structure of another casing, the protective plate may be made to be slightly smaller than the display panel.

Advantageous Effects

In the above-described display device of the present invention, the adhesive layer-equipped transparent surface material of the present invention is bonded to a display panel so that the adhesive layer is in contact with the display panel, whereby formation of voids at the interface between the display panel and the adhesive layer is sufficiently prevented.

The transparent surface material and the display panel are installed without via an air layer, whereby reflection of exterior light at an air interface can be prevented, such being particularly effective in the improvement of the display contrast when the display screen is viewed from an inclined angle.

In the present invention, a cured resin is used as the adhesive layer in the bonding of the adhesive layer-equipped transparent surface material and the display panel, whereby a shrinkage stress of the resin accompanying curing will not be formed, which is likely to be formed by curing after sandwiching an uncured curable compound or a semi-cured resin film between a transparent surface material and a display panel. Further, the shear modulus value of the layer portion of the adhesive layer is low, whereby a pressure to be formed at the time of bonding with the display panel is less likely to remain in the adhesive layer. Therefore, in a case where the display panel is a liquid crystal panel, an adverse effect to the liquid crystal alignment due to such a residual stress is prevented, and a good display quality can be obtained.

Particularly, in the case of a liquid crystal display panel of IPS (in plane switching) system, a display irregularity is likely to occur due to a stress exerted to the display panel, and the effect by application of the present invention is particularly large, and it is possible to sufficiently prevent a change in color from an inclined angle.

<Process for Producing Display Device>

The process for producing a display device of the present invention is a process wherein after removing the protective film from the adhesive layer-equipped transparent surface material of the present invention, the display panel and the adhesive layer-equipped transparent surface material of the present invention are laminated and bonded in a reduced pressure atmosphere of at most 100 Pa so that the adhesive layer is in contact with the display panel.

In order to facilitate the removal of the protective film, the adhesive layer may be cooled. By cooling the adhesive layer, deformation of the adhesive layer is prevented at the time of removing the protective film, and it is possible to increase the uniformity in thickness of the adhesive layer after removing the protective film and to prevent formation of voids at the time of bonding to the display panel.

The temperature for cooling the adhesive layer varies depending upon the glass transition temperature of the resin to be used as the adhesive layer, but when the glass transition temperature is taken as a temperature showing the maximum value of loss elastic modulus in the measurement of the shear modulus of elasticity, it is preferably at most the temperature higher by about 40° C. than the glass transition temperature. The lower limit temperature is not particularly limited, but it is usually at least −30° C., since depending upon the resin to be used for the protective film, the film tends to be brittle at a low temperature, and the film is likely to rupture at the time of removal.

The reduced pressure atmosphere at the time of bonding is at most 100 Pa, preferably from 1 to 100 Pa, more preferably from 5 to 50 Pa.

The period of time from the time when the display panel and the adhesive layer-equipped transparent surface material are laminated to the release of the reduced pressure atmosphere may be as long as at least a few hours, but from the viewpoint of the production efficiency, it is preferably within one hour, more preferably within one minute.

After bonding the display panel and the adhesive layer-equipped transparent surface material, an incompletely cured adhesive layer may be again irradiated with light or heated to accelerate the curing of the adhesive layer or to stabilize the cured state of the adhesive layer.

Advantageous Effects

In the above-described process for producing a display device of the present invention, the adhesive layer-equipped transparent surface material of the present invention is used wherein an adhesive layer is preliminarily formed on at least one surface of the transparent surface material, whereby the step of bonding it to the display panel may be only once, and bonding to the display panel is simple.

Further, the display panel and the adhesive layer-equipped transparent surface material of the present invention are laminated and bonded in a reduced pressure atmosphere of at most 100 Pa so that the adhesive layer is in contact with the display panel, whereby voids are less likely to remain at the interface between the display panel and the adhesive layer.

Especially, as the layer portion of the adhesive layer is surrounded by the barrier portion, the thickness of the layer portion can easily be made uniform, and accordingly, voids are less likely to be formed at the interface between the display panel and the adhesive layer. Further, the shear modulus of the layer portion is within a specific range, whereby when the display panel and the adhesive layer-equipped transparent surface material are bonded in a reduced pressure atmosphere and then returned to an atmospheric pressure atmosphere, voids will readily disappear and are less likely to remain.

Further, in the adhesive layer-equipped transparent surface material of the present invention, a relatively thick adhesive layer is formed while maintaining the uniformity in thickness on the surface of the transparent surface material having a large area, whereby it is possible to sufficiently prevent formation of voids even in bonding of the adhesive layer-equipped transparent surface material and the display panel having a large area which is likely to be deformed.

EXAMPLES

Now, practical Examples will be shown to confirm the effectiveness of the present invention, but it should be understood that the present invention is by no means restricted to such Examples.
(Number Average Molecular Weight)

The number average molecular weight of an oligomer was obtained as a number average molecular weight as calculated as polystyrene by using a GPC (gel permeation chromatography) measuring apparatus (HLC-8020, manufactured by TOSOH CORPORATION).
(Viscosity)

The viscosity of a photocurable resin composition was measured by an E-model viscometer (RE-85U, manufactured by TOKI SANGYO CO., LTD.)
(Haze Value)

The haze value was obtained by measurement in accordance with ASTM D1003 by using Haze-Gard II, manufactured by Toyo Seiki Seisaku-Sho, Ltd.
(Shear Modulus)

To determine the shear modulus of the layer portion of the adhesive layer after curing, using a rheometer (modular rheometer Physica MCR-301, manufactured by Anton Paar), a space between a measuring spindle and a light-transmitting plate is adjusted to be the same as the thickness of the layer portion, and the uncured first composition is disposed in the space, and while irradiating the uncured first composition with light required for curing at 35° C., the shear modulus during the curing process was measured, and the shear modulus of the layer portion under the curing condition at the time of forming the layer portion 18, was measured.

In the following Examples, as the transparent surface material, the supporting surface material, other surface materials such as a display panel, etc. and the barrier portion-forming photocurable resin composition, the following ones were used, respectively.

Examples 1 to 20

(Transparent Surface Material)

Along the peripheral portion of one surface of soda lime glass having a length of 100 mm, a width of 100 mm and a thickness of 3 mm, a light-shielding printed portion was formed in a frame-form by ceramic printing containing a black pigment, so that a light-transmitting portion would have a length of 68 mm and a width of 68 mm. Then, over the entire surface of the back side of the light-shielding printed portion, an antireflection film (ReaLook X401, manufactured by NOF Corporation) was bonded in such a state that a protective film is attached thereto, to prepare a protective plate A.
(Supporting Surface Material) On one side of a transparent plate made of soda lime glass having a length of 100 mm, a width of 100 mm and a thickness of 3 mm, a protective film (Puretect VLH-9, manufactured by Tohcello Co., Ltd.) having a length of 130 mm, a width of 130 mm and a thickness of 0.075 mm was bonded so that the adhesive surface of the protective film was in contact with the glass, by means of a rubber roll, to prepare a supporting surface material B having the protective film bonded thereto.
(Other Surface Materials Such as Display Panel, Etc.)

As another surface material such as a display panel to be bonded to the protective plate A via the adhesive layer, a surface material G having a polarizing film provided over one surface of soda lime glass having a length of 90 mm, a width of 90 mm and a thickness of 2 mm, was used. The protective plate A was bonded to the surface provided with the polarizing film. The surface material G is one simulating a liquid crystal display panel having substantially the same shape.
(Barrier Portion-Forming Photocurable Resin Composition)

A bifunctional polypropylene glycol having molecular terminals modified by ethylene oxide (number average molecular weight calculated by the hydroxy value: 4,000) and hexamethylene diisocyanate were mixed in a molar ratio of 6:7, then diluted with isobornyl acrylate (IBXA, manufactured by OSAKA ORGANIC CHEMICAL INDUSTRY LTD.) and then reacted at 70° C. in the presence of a catalyst of a tin compound to obtain a prepolymer, and to this prepolymer, 2-hydroxyethyl acrylate was added in a molar ratio of substantially 1:2, and reacted at 70° C. to obtain a solution of a urethane acrylate oligomer (hereinafter referred to as UC-1) diluted with 30 mass % of isobornyl acrylate. The number of curable groups in UC-1 was 2, and the number average molecular weight was about 55,000. The viscosity at 60° C. of the UC-1 solution was about 580 Pa·s.

90 parts by mass of the UC-1 solution and 10 parts by mass of 2-hydroxybutyl methacrylate (Light Ester HOB, manufactured by Kyoeisha Chemical Co., Ltd.) were uniformly mixed to obtain a mixture. 100 parts by mass of such a mixture, 0.9 part by mass of 1-hydroxy-cyclohexyl-phenyl-ketone (photopolymerization initiator, IRGACURE 184, manufactured by Ciba Specialty Chemicals), 0.1 part by mass of bis(2,4,6-trimethylbenzoyl)-phenylphosphine oxide (photopolymerization initiator, IRGACURE 819, manufactured by Ciba Specialty Chemicals) and 0.04 part by mass of 2,5-di-tert-butylhydroquinone (polymerization inhibitor, manufactured by Tokyo Chemical Industry Co., Ltd.) were uniformly mixed to obtain a barrier portion-forming photocurable resin composition C.

The barrier portion-forming photocurable resin composition C was set in a pressure reducing device, as it was put in a container in an open state, and the inside of the pressure reducing device was evacuated to about 20 Pa and maintained for 10 minutes to carry out degassing treatment. The viscosity at 25° C. of the barrier portion-forming photocurable resin composition C was measured and found to be about 1,470 Pa·s.

Examples 1 to 7

(Layer Portion-Forming Photocurable Resin Composition)

A bifunctional polypropylene glycol having molecular terminals modified with ethylene oxide (number average molecular weight calculated from the hydroxy value: 4,000) and isophorone diisocyanate were mixed in a molar ratio of 4:5 and reacted at 70° C. in the presence of a catalyst of a tin compound to obtain a prepolymer, and to such a prepolymer, 2-hydroxyethyl acrylate was added in a molar ratio of substantially 1:2 and reacted at 70° C. to obtain a urethane acrylate oligomer (hereinafter referred to as UA-1). The number of curable groups in UA-1 was 2, the number average molecular weight was about 24,000, and the viscosity at 25° C. was about 830 Pa·s.

40 parts by mass of UA-1, 30 parts by mass of 2-hydroxybutyl methacrylate (Light Ester HOB, manufactured by Kyoeisha Chemical Co., Ltd.) and 30 parts by mass of n-dodecyl methacrylate were uniformly mixed, and to 100 parts by mass of such a mixture, 0.5 part by mass of bis(2,4,6-trimethylbenzoyl)-phenyl phosphine oxide (photopolymerization initiator, IRGACURE 819, manufactured by Ciba Specialty Chemicals) and 0.01 part by mass of 2,5-di-tert-butylhydroquinone (polymerization inhibitor, manufactured by Tokyo Chemical Industry Co., Ltd.) were uniformly dissolved to obtain a composition PD.

Then, in the proportions (unit: parts by mass) as shown in Table 1, the composition PD and a non-curable oligomer (d1) were uniformly dissolved to obtain a layer portion-forming photocurable resin composition D.

As the non-curable oligomer (d1), the same bifunctional polypropylene glycol having molecular terminals modified with ethylene oxide (number average molecular weight calculated from the hydroxy value: 4,000) as used in the synthesis of UA-1, was used.

In the Table, the unit of the amount of the non-curable oligomer (d1) is the proportion (mass %) when the entirety of the layer portion-forming photocurable resin composition D is 100 mass % (the same applies hereinafter). For example, in the case of Example 2, 80 parts by mass of the composition PD and 20 parts by mass of the non-curable oligomer (d1) were mixed to prepare a layer portion-forming photocurable resin composition D.

The layer portion-forming photocurable resin composition D was set in a pressure reducing device as it was put in a container in an open state, and inside of the pressure reducing device was evacuated to about 20 Pa and maintained for 10 minutes to carry out degassing treatment. The viscosity (unit: Pa·s) at 25° C. of the layer portion-forming photocurable resin composition D was measured, and the result is shown in Table 1.

(Step (a))

Over the entire periphery at a position of about 5 mm from the inner edge of the light-shielding printed portion of the protective plate A, the barrier portion-forming photocurable resin composition C was applied by a dispenser so that the width would be about 0.7 mm and the applied thickness would be about 0.6 mm, to form an uncured barrier portion.

Then, ultraviolet light and visible light of at most 450 nm from a chemical lamp (FL15BL manufactured by NEC Corporation, peak wavelength: 365 nm, irradiation intensity: 2 mW/cm$^2$) were uniformly applied for 30 seconds to the uncured barrier portion formed on the protective plate A. The viscosity of the uncured barrier portion was thereby increased.

(Step (b))

To a region inside of the barrier portion formed on the protective plate A, the layer portion-forming photocurable resin composition D was supplied at plural portions so that the total mass would be 2.4 g, by means of a dispenser.

During the period for supplying the layer portion-forming photocurable resin composition D, the shape of the uncured barrier portion was maintained.

(Step (c))

On a lower platen in a pressure reducing device wherein a lifting and lowering device comprising a pair of platens was installed, the protective plate A was flatly placed so that the surface of the layer portion-forming photocurable resin composition D faces upward.

By means of electrostatic chucks, the supporting surface material B having the protective film bonded thereto was held by the lower surface of the upper platen of the lifting and lowering device in the pressure reducing device, so that the distance from the protective plate B would be 10 mm in a vertical direction.

The pressure reducing device was made to be in a sealed state and evacuated until the pressure in the pressure reducing device became about 40 Pa. By the lifting and lowering device in the pressure reducing device, the upper and lower platens were brought to be close to each other, and the protective plate A and the supporting surface material B having the protective film bonded thereto, were pressed under a pressure of 2 kPa via the layer portion-forming photocurable resin composition D and maintained for 10 seconds. The electrostatic chucks were switched off, and the supporting surface material was released from the upper platen, and in about 15 seconds, inside of the pressure releasing device was returned to an atmospheric pressure atmosphere to obtain a laminate E wherein an uncured layer portion made of the layer portion-forming photocurable resin composition D was sealed by the protective plate A, the protective film and the uncured barrier portion.

In the laminate E, the shape of the uncured barrier portion was maintained to be substantially the same as the initial state.

(Step (d))

To the uncured barrier portion and the uncured layer portion of the laminate E, from the supporting surface material side, ultraviolet light and visible light of at most 450 nm from a chemical lamp (FL15BL, manufactured by NEC Corporation, peak wavelength: 365 nm, irradiation intensity: 2 mW/cm$^2$) were uniformly applied for 10 minutes to cure the uncured barrier portion and the uncured layer portion to form an adhesive layer.

The irradiation intensity was measured by means of an illuminometer (ultraviolet intensity meter Unimeter UIT-101, manufactured by USHIO INC.)

A step of removing voids as required at the time of the production by a conventional injection method, is not required. Nevertheless, in each of Examples 1 to 7, no defects such as voids, etc. remaining in the adhesive layer were observed. Further, defects such as leakage, etc. of the layer portion-forming photocurable resin composition from the barrier portion, were also not observed. The thickness of the layer portion after curing was 0.4 mm and was substantially uniform.

(Step (e))

The supporting surface material was removed from the protective film to obtain an adhesive layer-equipped transparent surface material F having the protective film bonded thereto.

The shear modulus of the layer portion of the adhesive layer was measured, and the results are shown in Table 1. In Example 7, the curing of the adhesive layer was inadequate, and no measurement of the shear modulus was carried out.

(Lamination with Another Surface Material)

After removing the supporting surface material B from the protective film, the assembly was left to stand for 24 hours. Then, the protective film was removed from the adhesive layer on the transparent surface material F, and the adhesive layer-equipped transparent surface material F having the protective film removed, was flatly placed on the lower platen in a pressure reducing device wherein a lifting and lowering device comprising a pair of platens was installed, so that the surface of the adhesive layer faced upward.

By means of electrostatic chucks, a surface material G was held by the lower surface of the upper platen in the lifting and lowering device in the pressure reducing device, so that the distance from the adhesive layer-equipped transparent surface material F became 10 mm.

The pressure reducing device was made to be in a sealed state and evacuated until the pressure in the pressure reducing device became about 30 Pa. By the lifting and lowering device in the pressure reducing device, the upper and lower platens were brought to be close to each other, and the display panel G and the adhesive layer-equipped transparent surface material F were pressed under a pressure of 2 kPa via the adhesive layer and held for 10 seconds. The electrostatic chucks were switched off, and the surface material G was removed from the upper platen, and in about 20 seconds, inside of the pressure reducing device was returned to an atmospheric pressure to obtain a laminate product H.

Remaining of voids at the time of laminating the adhesive layer-equipped transparent surface material F and the surface material G was observed at points of time of being left to stand still for 20 minutes, 1 hour, 3 hours and 24 hours from immediately after the production of the laminate product H, and the results are shown in Table 1 wherein a case where no remaining voids were observed, is identified by ◯, and a case where remaining voids were observed, is identified by x.

As shown by the results in Table 1, in Example 1 wherein the non-curable oligomer d1 was not contained, and in Example 2 wherein the content of d1 was 20 mass %, even after being left to stand for 24 hours, voids at the time of lamination still remained, and the quality of the laminate product H was also not desirable. On the other hand, in Examples 3 to 6 wherein the non-curable oligomer d1 was contained from 40 to 70 mass %, voids disappeared within 3 hours in each case, and particularly in Examples 5 and 6, voids disappeared in only 20 minutes, and the productivity was high and good.

In Example 7 wherein the non-curable oligomer d1 was contained in 80 mass %, the shear modulus of the adhesive layer became too small, and the adhesive layer was substantially deformed at the time of removing the protective film from the transparent surface material F, whereby lamination with the surface material G was not possible.

With respect to Example 5, after being left in an environment at 60° C. with a relative humidity of 90% for 500 hours, the laminate product was observed, whereby no formation of voids was observed, and there was no change from the initial state.

Example 8

Laminate product H-a was obtained in the same manner as in Example 5 except that instead of the non-curable oligomer d1, a bifunctional polypropylene glycol (number average molecular weight calculated from the hydroxy value: 2,000) was used as the non-curable oligomer d2. In the same manner as in Examples 1 to 7, remaining of voids at the time of lamination for laminate product H-a was evaluated, and the result is shown in Table 1. Voids disappeared in 20 minutes, and the productivity was high and good.

Example 9

40 parts by mass of UA-1, 40 parts by mass of 2-hydroxybutyl methacrylate (Light Ester HOB, manufactured by Kyoeisha Chemical Co., Ltd.) and 20 parts by mass of n-dodecyl methacrylate were uniformly mixed, and to 100 parts by mass of such a mixture, 0.5 part by mass of bis(2,4,6-trimethylbenzoyl)-phenyl phosphine oxide (photopolymerization initiator, IRGACURE 819, manufactured by Ciba Specialty Chemicals) and 0.01 part by mass of 2,5-di-tert-butyl hydroquinone (polymerization inhibitor, manufactured by Tokyo Chemical Industry Co., Ltd.) were uniformly dissolved to obtain a composition PD-a.

A laminate product H-b was obtained in the same manner as in Example 5 except that PD-a was used instead of the composition PD. In the same manner as in Examples 1 to 8, remaining of voids at the time of lamination for laminate production H-b was evaluated, and the result is shown in Table 1. Voids disappeared in 3 hours.

Example 10

40 parts by mass of UA-1, 20 parts by mass of 2-hydroxybutyl methacrylate (Light Ester HOB, manufactured by Kyoeisha Chemical Co., Ltd.) and 40 parts by mass of n-dodecyl methacrylate were uniformly mixed, and to 100 parts by mass of this mixture, 0.5 part by mass of bis(2,4,6-trimethylbenzoyl)-phenyl phosphine oxide (photopolymerization initiator, IRGACURE 819, manufactured by Ciba Specialty Chemicals) and 0.01 part by mass of 2,5-di-tert-butylhydroquinone (polymerization inhibitor, manufactured by Tokyo Chemical Industry Co., Ltd.) were uniformly dissolved to obtain a composition PD-b.

A laminate product H-c was obtained in the same manner as in Example 4 except that the composition PD-b was used instead of the composition PD used in Example 3. In the same manner as in Examples 1 to 9, remaining of voids at the time of lamination for the laminate product H-c was evaluated, and the result is shown in Table 1. Voids disappeared in 20 minutes, and the productivity was high and good.

Example 11

A laminate product H-d was obtained in the same manner as in Example 3 except that the composition PD used in Example 3 was changed to the composition PD-b used in Example 10, and further, instead of the non-curable oligomer d1 used in Example 3, a trifunctional polypropylene glycol having molecular terminals modified with ethylene oxide (number average molecular weight calculated from the hydroxy value: 10,000) was used as a non-curable oligomer d3. In the same manner as in Examples 1 to 10, remaining of voids at the time of lamination for the laminate product H-d was evaluated, and the result is shown in Table 1. Voids disappeared in 20 minutes, and the productivity was high and good.

Then, in the proportions (unit: parts by mass) shown in Table 2, the composition PD-c and the non-curable oligomer (d1) were uniformly dissolved to obtain a layer portion-forming photocurable resin composition D-c.

Examples 19 to 20

40 parts by mass of UA-1, 40 parts by mass of 2-hydroxybutyl methacrylate (Light Ester HOB, manufactured by Kyoeisha Chemical Co., Ltd.) and 20 parts by mass of

TABLE 1

| | | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| Layer portion-forming curable resin composition D | Compositions PD PD-a PD-b (parts by mass) | Curable composition | Urethane acrylate oligomer UA-1 | 40 | 40 | 40 | 40 | 40 | 40 | 40 | 40 | 40 | 40 | 40 |
| | | | 2-hydroxybutyl methacrylate | 30 | 30 | 30 | 30 | 30 | 30 | 30 | 30 | 40 | 20 | 20 |
| | | | n-dodecyl methacrylate | 30 | 30 | 30 | 30 | 30 | 30 | 30 | 30 | 20 | 40 | 40 |
| | | | Photopolymerization initiator | 0.5 | 0.5 | 0.5 | 0.5 | 0.5 | 0.5 | 0.5 | 0.5 | 0.5 | 0.5 | 0.5 |
| | | | Polymerization inhibitor | 0.01 | 0.01 | 0.01 | 0.01 | 0.01 | 0.01 | 0.01 | 0.01 | 0.01 | 0.01 | 0.01 |
| | Non-curable oligomer d1 (mass % in the entire composition D) | | | 0 | 20 | 40 | 50 | 60 | 70 | 80 | 0 | 60 | 50 | 0 |
| | Non-curable oligomer d2 (mass % in the entire composition D) | | | 0 | 0 | 0 | 0 | 0 | 0 | 0 | 60 | 0 | 0 | 0 |
| | Non-curable oligomer d3 (mass % in the entire composition D) | | | 0 | 0 | 0 | 0 | 0 | 0 | 0 | 0 | 0 | 0 | 40 |
| | Viscosity (Pa·s) | | | 2.2 | 1.9 | 1.6 | 1.5 | 1.3 | 1.3 | 1.2 | 0.9 | 1.6 | 1.5 | 2.4 |
| Layer portion of adhesive layer | Shear modulus (kPa) | | | 300 | 120 | 30 | 14 | 4 | 0.8 | — | 1.4 | 13 | 8 | 11 |
| Evaluation of laminate product (time required for disappearance of voids after lamination) | Voids disappeared in 20 minutes | | | X | X | X | X | ○ | ○ | — | ○ | X | ○ | ○ |
| | Voids disappeared in 1 hour | | | X | X | X | ○ | — | — | — | — | X | — | — |
| | Voids disappeared in 3 hours | | | X | X | ○ | — | — | — | — | — | ○ | — | — |
| | Voids disappeared in 24 hours | | | X | X | — | — | — | — | — | — | — | — | — |

As shown by the results in Table 1, in Examples 3 to 6 and 8 to 11 wherein the shear modulus of the layer portion was within the range of the present invention, when the adhesive layer-equipped transparent surface material was bonded to a surface material in a reduced pressure atmosphere and then returned to an atmospheric pressure atmosphere, the period of time until voids formed at the interface between the adhesive layer and the surface material disappeared, was shortened. Particularly in Examples 5, 6, 8, 10 and 11, large effects were obtained.

Examples 12 to 18

40 parts by mass of UA-1, 20 parts by mass of 2-hydroxybutyl methacrylate (Light Ester HOB, manufactured by Kyoeisha Chemical Co., Ltd.) and 40 parts by mass of n-dodecyl methacrylate were uniformly mixed, and to 100 parts by mass of this mixture, 0.3 part by mass of bis(2,4,6-trimethylbenzoyl)-phenyl phosphine oxide (photopolymerization initiator, IRGACURE 819, manufactured by Ciba Specialty Chemicals), 0.04 part by mass of 2,5-di-tert-butylhydroquinone (polymerization inhibitor, manufactured by Tokyo Chemical Industry Co., Ltd.), 0.3 part by mass of an ultraviolet absorber (TINUVIN 109, manufactured by Ciba Specialty Chemicals) and 0.5 part by mass of n-dodecylmercaptan (chain extender, THIOKALCOL 20, manufactured by Kao Corporation) were uniformly dissolved to obtain a composition PD-c.

n-dodecyl methacrylate were uniformly mixed, and to 100 parts by mass of this mixture, 0.3 part by mass of bis(2,4,6-trimethylbenzoyl)-phenyl phosphine oxide (photopolymerization initiator, IRGACURE 819, manufactured by Ciba Specialty Chemicals), 0.04 part by mass of 2,5-di-tert-butylhydroquinone (polymerization inhibitor, manufactured by Tokyo Chemical Industry Co., Ltd.), 0.3 part by mass of an ultraviolet absorber (TINUVIN 109, manufactured by Ciba Specialty Chemicals) and 0.5 part by mass of n-dodecylmercaptan (chain extender, THIOKALCOL 20, manufactured by Kao Corporation) were uniformly dissolved to obtain a composition PD-d.

Then, in the proportions (unit: parts by mass) shown in Table 2, the composition PD-d and the non-curable oligomer (d1) were uniformly dissolved to obtain a layer portion-forming photocurable resin composition D-d.

[Evaluation]

A laminate product was produced in the same manner as in Example 1 to 7 by using the layer portion-forming photocurable resin composition D-c or D-d, and measurements and evaluation of the respective items were carried out. The results are shown in Table 2.

In step (b), during the period for supplying the layer portion-forming photocurable resin composition D-c or D-d, the shape of the barrier portion was maintained. The shape of the uncured barrier portion in the laminate E in step (c) was maintained to be substantially the same as in the initial state. In the adhesive layer-equipped transparent surface material F after curing in step (d), defects such as voids, etc.

remaining in the adhesive layer were not observed. Further, defects such as leakage, etc. of the layer portion-forming photocurable resin composition from the barrier portion were also not observed. The thickness of the layer portion after curing was about 0.4 mm and substantially uniform in each case.

length of 100 mm, a width of 100 mm and a thickness of 2 mm, as another surface material such as a display panel, instead of the surface material G having a polarizing film provided on one surface of soda lime glass having a length of 90 mm, a width of 90 mm and a thickness of 2 mm, used in Examples 1 to 20. The phase value to incident light from

TABLE 2

| | | | | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Layer portion-forming curable resin composition D-c | Compositions PD-c PD-d (parts by mass) | Curable composition | Urethane acrylate oligomer UA-1 | 40 | 40 | 40 | 40 | 40 | 40 | 40 | 40 | 40 |
| | | | 2-hydroxybutyl methacrylate | 20 | 20 | 20 | 20 | 20 | 20 | 20 | 40 | 40 |
| | | | n-dodecyl methacrylate | 40 | 40 | 40 | 40 | 40 | 40 | 40 | 20 | 20 |
| | | | Photopolymerization initiator | 0.3 | 0.3 | 0.3 | 0.3 | 0.3 | 0.3 | 0.3 | 0.3 | 0.3 |
| | | | Polymerization inhibitor | 0.04 | 0.04 | 0.04 | 0.04 | 0.04 | 0.04 | 0.04 | 0.04 | 0.04 |
| | | | Ultraviolet absorber | 0.3 | 0.3 | 0.3 | 0.3 | 0.3 | 0.3 | 0.3 | 0.3 | 0.3 |
| | | | Chain extender | 0.5 | 0.5 | 0.5 | 0.5 | 0.5 | 0.5 | 0.5 | 0.5 | 0.5 |
| | Non-curable oligomer d1 (mass % in the entire composition D-c) | | | 0 | 10 | 20 | 30 | 40 | 50 | 60 | 60 | 70 |
| | Viscosity (Pa · s) | | | 2.0 | 1.9 | 1.9 | 1.8 | 1.6 | 1.5 | 1.4 | 1.5 | 1.3 |
| Layer portion of adhesive layer | Shear modulus (kPa) | | | 150 | 75 | 37 | 27 | 9 | 2.3 | — | 6 | 1.1 |
| Evaluation of laminate product (time required for disappearance of voids after lamination) | Voids disappeared in 20 minutes | | | X | X | X | X | ○ | ○ | — | ○ | ○ |
| | Voids disappeared in 1 hour | | | X | ○ | ○ | ○ | — | — | — | — | — |
| | Voids disappeared in 3 hours | | | X | — | — | — | — | — | — | — | — |
| | Voids disappeared in 24 hours | | | ○ | — | — | — | — | — | — | — | — |

As shown by the results in Table 2, also in Example 12 wherein the non-curable oligomer d1 was not contained, remaining of voids at the time of laminating the adhesive layer-equipped transparent surface material F and the surface material G, was not observed in 24 hours. Whereas, in each of Examples 13 to 17, wherein the shear modulus of the layer portion was within the range of the present invention, voids disappeared in 1 hour, and the productivity was increased and good.

It is thereby evident that when a chain extender is added, the shear modulus of the layer portion becomes sufficiently low and it is possible to obtain an effect to shorten the time until voids disappear, even when the amount of the non-curable oligomer added, was small.

Further, in Example 18, wherein the non-curable oligomer was incorporated in a larger amount than in Examples 13 to 17, curing of the adhesive layer was inadequate, and removal of the protective film was difficult, and the measurement of the shear modulus was not conducted. Thus, it has been found that in a case where a chain extender is to be added, the content of the non-curable oligomer should better be lower than the case where a chain extender is not added.

Further, as shown in Examples 19 and 20, in a case where a chain extender was added, it was possible to increase the curing property of the adhesive layer by incorporating the monomer (B4) having an alkyl group in an amount larger than the monomer (B3) having a hydroxy group, and even in a case where the content of the non-curable oligomer was as high as from 60 to 70 mass %, it was possible to let voids disappear in 20 minutes, and the productivity was high and good.

Example 21

A laminate product was obtained in the same manner as in Examples 1 to 20 by using only soda lime glass having a the normal direction of the surface material of the obtained laminate product was measured at 25° C. and found to be at most 1% in every case.

Example 22

(Transparent Surface Material)
Along the peripheral portion of one surface of soda lime glass having a length of 510 mm, a width of 330 mm and a thickness of 3 mm, a light-shielding printed portion was formed in a frame-form by ceramic printing containing a black pigment so that the light transmitting portion would have a length of 476 mm and a width of 298 mm. Then, over the entire surface of the back side of the light-shielding printed portion, an antireflection film (ReaLook X4001, manufactured by NOF Corporation) was bonded in such a state that a protective film was attached, to prepare a protective plate A'.
(Supporting Surface Material)
On one side of soda lime glass having a length of 610 mm, a width of 610 mm and a thickness of 3 mm, a protective film having a length of 610 mm, a width of 400 mm and a thickness of 0.075 mm (Puretect VLH-9, manufactured by Tohcello Co., Ltd.) was bonded so that the adhesive surface of the protective film was in contact with the glass, by means of a rubber roll, to prepare a supporting surface material B' having a protective film bonded thereto.
(Another Surface Material Such as Display Panel)
A liquid crystal display device was taken out from a commercially available 22-model liquid crystal monitor (product number: 2209WA, manufactured by DELL). The liquid display device had a display mode of IPS (in plane switching) type and had a length of 489 mm, a width of 309 mm and a thickness of about 2 mm. On both surfaces of the liquid crystal panel, polarizing plates were bonded, and on one side of the long size, six sheets of driving FPC were bonded, and at the ends of FPC, a printed circuit board was bonded. The image display region had a length of 474 mm and a width of 296 mm. Such a liquid crystal display device was designated as a display panel G'.

(Barrier Portion-Forming Photocurable Resin Composition)

In the same manner as in Examples 1 to 20, the barrier portion-forming photocurable resin composition C was used.

(Layer Portion-Forming Photocurable Resin Composition)

The same layer portion-forming photocurable resin composition D as in Example 5 was used.

(Step (a))

Over the entire periphery at a position of about 5 mm from the inner edge of the light-shielding printed portion of the protective plate A', the barrier portion-forming photocurable resin composition C was applied by a dispenser so that the width would be about 1 mm and the coating thickness would be about 0.6 mm to form an uncured barrier portion.

(Step (b))

In a region inside of the uncured barrier portion applied to the protective plate A', the layer portion-forming photocurable resin composition D was supplied at plural portions so that the total mass would be 62 g, by means of a dispenser.

During the period for supplying the layer portion-forming photocurable resin composition D, the shape of the uncured barrier portion was maintained.

(Step (c))

The protective plate A' was flatly placed on a lower platen in a pressure reducing device wherein a lifting and lowering device comprising a pair of platens was installed, so that the surface of the layer portion-forming photocurable resin composition D faced upward. By means of electrostatic chucks, the supporting surface material B' having a protective film bonded thereto, was held by the lower surface of the upper platen of the lifting and lowering device in the pressure reducing device, so that the distance from the protective plate B' became 30 mm in a vertical direction.

The pressure reducing device was made in a sealed state and evacuated until the pressure inside of the pressure reducing device became about 10 Pa. By the lifting and lowering device in the pressure reducing device, the upper and lower platens were brought to be close to each other, and the protective plate A' and the supporting surface material B' having a protective film bonded thereto, were pressed under a pressure of 2 kPa via the layer portion-forming photocurable resin composition D and held for one minute. The electrostatic chucks were switched off, and from the upper platen, the supporting surface material was released, and in about 15 seconds, the inside of the pressure reducing device was returned to the atmospheric pressure atmosphere, to obtain a laminate E' wherein an uncured layer portion made of the layer portion-forming photocurable resin composition D was sealed by the protective plate A, the protective film and the uncured barrier portion.

In the laminate E', the shape of the uncured barrier portion was maintained to be substantially the same as in the initial state.

(Step (d))

To the uncured barrier portion and the uncured layer portion of the laminate E', from the supporting surface material side, ultraviolet light and visible light of at most 450 nm from a chemical lamp were uniformly applied to cure the uncured barrier portion and the uncured layer portion to form an adhesive layer. A step of removing voids as required at the time of the production by a conventional injection method, was not required, and nevertheless, defects such as voids, etc. remaining in the adhesive layer were not observed. Further, defects such as leakage, etc. of the layer portion-forming photocurable resin composition from the barrier portion were also not observed. Further, the thickness of the adhesive layer was as thick as desired (about 0.4 mm).

(Step (e))

The supporting surface material was removed from the protective film to obtain an adhesive layer-equipped transparent surface material F' having the protective film bonded thereto.

After removing the supporting surface material from the protective film, the laminate was left to stand for 24 hours, and then, the protective film was removed from the adhesive layer on the transparent surface material F'.

(Production of Display Device)

The adhesive layer-equipped transparent surface material F' having the protective film removed, was flatly placed on the lower platen in the pressure reducing device wherein a lifting and lowering device comprising a pair of platens was installed, so that the surface of the adhesive layer faced upward.

By means of electrostatic chucks, the display panel G' was held by the lower surface of the upper platen of the lifting and lowering device in the pressure reducing device, so that the distance from the adhesive layer-equipped transparent surface material F' became 30 mm.

The pressure reducing device was made in a sealed state and evacuated until the pressure in the pressure reducing device became about 10 Pa. By the lifting and lowering device in the pressure reducing device, the upper and lower platens were brought to be close to each other, and the display panel G' and the adhesive layer-equipped transparent surface material F' were pressed under a pressure of 2 kPa via the adhesive layer and held for one minute. The electrostatic chucks were switched off, and from the upper platen, the display panel G' was released, and in about 20 seconds, inside of the pressure reducing device was returned to the atmospheric pressure, to obtain a display device H'.

When the display device H' was observed immediately after lamination with the adhesive layer-equipped transparent surface material F', many fine voids were observed at the interface between the display panel G' and the adhesive layer. The display device H' was left to stand for 20 minutes and then observed again, whereby voids were found all disappeared, and a display device H' was obtained wherein the display panel G' and the adhesive layer-equipped transparent surface material F' were bonded via the adhesive layer without any defects.

The display device H' was returned to the casing for a liquid crystal monitor from which the liquid crystal panel G' was taken out, and wirings were connected again, and then the liquid crystal monitor was set so that the display device H' became vertical. The monitor was left to stand still for two days and then switched on and connected to a computer to display an image, whereby over the entire surface of the display screen, a uniform good display image was obtained, and further, a display contrast was higher than the initial. Even when the image display screen was pressed strongly with a finger, the image was not disturbed, and the transparent surface material A' was found to effectively protect the display panel G'.

Then, in the same manner, the display device F' was installed, and one month later, the bonded position of the display device was checked, whereby no displacement, etc. were observed, and the display device was well held to the glass plate.

INDUSTRIAL APPLICABILITY

According to the present invention, bonding of the display panel and the transparent surface material (the protective plate) is simple, and voids are less likely to remain at the interface between the display panel and the adhesive layer, such being suitable for the production of a display device having a large surface area.

REFERENCE SYMBOLS

1: Adhesive layer-equipped transparent surface material
2: Display device
10: Protective plate (transparent surface material)
14: Adhesive layer
16: Protective film
18: Layer portion
20: Barrier portion
22: Uncured barrier portion
24: Region
26: Layer portion-forming photocurable resin composition
36: Supporting surface material
50: Display panel

What is claimed is:

1. An adhesive layer comprising:
a cured product of a composition which comprises a curable component and a non-curable oligomer,
wherein:
the curable component comprises a curable oligomer which comprises a curable group and a urethane bond,
the non-curable oligomer comprises a hydroxy group and does not undergo a curing reaction with the curable component,
the non-curable oligomer has a number average molecular weight per one hydroxy group of from 400 to 8,000,
the number of hydroxy groups per one molecule of the non-curable oligomer is from 1.8 to 3,
the curable oligomer and the non-curable oligomer comprise:
a same repeating unit comprising a polyoxyalkylene structure; or
repeating units derived from a same monomer comprising a polyoxyalkylene structure,
a content of the non-curable oligomer is from 10 to 70 mass % in a total of the composition, and
the adhesive layer has a shear modulus at 35° C. of from 0.5 to 100 kPa.

2. The adhesive layer according to claim 1, wherein the curable component further comprises a monomer which comprises a curable group and a hydroxy group.

3. The adhesive layer according to claim 2, wherein the monomer has a molecular weight of from 125 to 600.

4. The adhesive layer according to claim 2, wherein the monomer comprises a hydroxy methacrylate which comprises a $C_{3-8}$ hydroxyalkyl group having from 1 to 2 hydroxy groups.

5. The adhesive layer according to claim 1, wherein the curable oligomer has a number average molecular weight of from 1,000 to 100,000.

6. The adhesive layer according to claim 1, wherein the curable oligomer has an average of from 1.8 to 4 curable groups per one molecule.

7. The adhesive layer according to claim 1, wherein a content of a curable oligomer is from 20 to 90 mass % in a total of the curable component.

8. The adhesive layer according to claim 1, wherein the curable component further comprises an alkyl methacrylate comprising a $C_{8-22}$ alkyl group.

9. The adhesive layer according to claim 6, wherein the non-curable oligomer is a polyoxyalkylene polyol, and the curable oligomer is a urethane oligomer which is a reaction product of raw materials which comprise a polyoxyalkylene polyol and a polyisocyanate.

10. The adhesive layer according to claim 9, wherein a molecular weight of the polyoxyalkylene polyol which is contained in the raw materials is larger than a molecular weight of the polyoxyalkylene polyol contained in the non-curable oligomer.

11. The adhesive layer according to claim 1, wherein the composition does not comprise a chain transfer agent, or comprises a chain transfer agent in an amount of at most 1 part by mass per 100 parts by mass of the curable component.

12. A composition comprising: a curable component; and a non-curable oligomer,
wherein:
the curable component comprises a curable oligomer which comprises a curable group and a urethane bond,
the non-curable oligomer comprises a hydroxy group and does not undergo a curing reaction with the curable component,
the non-curable oligomer has a number average molecular weight per one hydroxy group of from 400 to 8,000,
the number of hydroxy groups per one molecule of the non-curable oligomer is from 1.8 to 3,
the curable oligomer and the non-curable oligomer comprise:
a same repeating unit comprising a polyoxyalkylene structure; or
repeating units derived from a same monomer comprising a polyoxyalkylene structure,
a content of the non-curable oligomer is from 10 to 70 mass % in a total of the composition, and
the composition when cured has a shear modulus at 35° C. of from 0.5 to 100 kPa.

13. The composition according to claim 12, wherein the non-curable oligomer is a polyoxyalkylene polyol, the curable oligomer is a urethane oligomer which is a reaction product of raw materials which comprise a polyoxyalkylene polyol and a polyisocyanate, and the curable oligomer has an average of from 1.8 to 4 curable groups per one molecule.

* * * * *